(12) United States Patent
Fujisaki et al.

(10) Patent No.: US 10,020,480 B2
(45) Date of Patent: Jul. 10, 2018

(54) LAYERED-DOUBLE-HYDROXIDE-CONTAINING COMPOSITE MATERIAL AND METHOD FOR PRODUCING SAME

(71) Applicant: NGK INSULATORS, LTD., Nagoya (JP)

(72) Inventors: Megumi Fujisaki, Nagoya (JP); Naomi Saito, Nagoya (JP); Naohito Yamada, Nagoya (JP); Sho Yamamoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/007,474

(22) Filed: Jan. 27, 2016

(65) Prior Publication Data

US 2016/0141582 A1     May 19, 2016

Related U.S. Application Data

(63) Continuation of application No. PCT/JP2014/083215, filed on Dec. 16, 2014.

(30) Foreign Application Priority Data

Dec. 27, 2013 (JP) ................................. 2013-271993
Jun. 27, 2014 (JP) ................................. 2014-132581

(51) Int. Cl.
*H01M 2/16* (2006.01)
*H01M 2/14* (2006.01)

(52) U.S. Cl.
CPC ......... *H01M 2/1686* (2013.01); *H01M 2/145* (2013.01); *H01M 2/1646* (2013.01)

(58) Field of Classification Search
CPC .................................................. H01M 2/1646
See application file for complete search history.

(56) References Cited

U.S. PATENT DOCUMENTS 9,293,791 B2 *   3/2016   Yamada ................. H01M 10/24
9,692,026 B2 *   6/2017   Hashimoto ......... H01M 2/1646
(Continued)

FOREIGN PATENT DOCUMENTS

CN           1333113 C       8/2007
JP      2005-310612 A1      11/2005
(Continued)

OTHER PUBLICATIONS

Liu et al, "Structured chiral adsorbent formed by cyclodextrinmodified layered solid film", Feb. 12, 2009.*
(Continued)

*Primary Examiner* — Barbara L Gilliam
*Assistant Examiner* — Nathanael T Zemui
(74) *Attorney, Agent, or Firm* — Burr & Brown, PLLC

(57) ABSTRACT

Provided is a layered-double-hydroxide-(LDH) containing composite material including a porous substrate and a high density LDH-containing functional layer on and/or in the porous substrate. The LDH-containing composite material of the present invention includes the porous substrate and the functional layer formed on and/or in the porous substrate. The functional layer contains a layered double hydroxide represented by the general formula $M^{2+}_{1-x}M^{3+}_x(OH)_2 A^{n-}_{x/n} \cdot mH_2O$ (where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents a value not less than 0) and has water impermeability.

21 Claims, 12 Drawing Sheets

(56) References Cited

U.S. PATENT DOCUMENTS

| | | | |
|---|---|---|---|
| 2010/0212712 A1* | 8/2010 | Tran | C06C 15/00 |
| | | | 136/205 |
| 2012/0077109 A1* | 3/2012 | Hong | C08J 5/22 |
| | | | 429/492 |
| 2014/0227616 A1 | 8/2014 | Yamada et al. | |
| 2014/0315099 A1 | 10/2014 | Yamada et al. | |

FOREIGN PATENT DOCUMENTS

| | | |
|---|---|---|
| JP | 2013-191523 A1 | 9/2013 |
| WO | 2006/050648 A1 | 5/2006 |
| WO | WO2010109670 A1 * | 9/2010 |
| WO | 2013/073292 A1 | 5/2013 |
| WO | 2013/118561 A1 | 8/2013 |

OTHER PUBLICATIONS

Guo et al, "Layered double hydroxide films: synthesis, properties and applications", Jun. 15, 2010.*

Lu et. al, "In situ growth of layered doublehydroxide films onanodic aluminum oxide/aluminum and its catalytic feature in aldol condensation of acetone", Chemical Engineering Science 63 (2008) 4055-4062.*

Lu et.al, "Microstructure-controlled synthesis of oriented layered double hydroxide thin films: Effect of varying the preparation conditions and a kinetic and mechanistic study of film formation", Chemical Engineering Science 62 (2007) 6069-6075.*

Tadanaga et.al, "Effect of Mg/Al Ratio on Hydroxide Ion Conductivity for Mg—Al Layered Double Hydroxide and Application to Direct Ethanol Fuel Cells", Journal of the Electrochemical Society, 159 (4) B368-B370 (2012).*

Xiaoxiao Guo, Fazhi Zhang, David G. Evans and Xue Duan, "Layered double hydroxide films: synthesis, properties and applications", The Royal Society of Chemistry, Chem. Commun., 2010, 46, 5197-5210, Accepted May 14, 2010, First published as an Advance Article on the web Jun. 15, 2010.*

F. Javier Echave, Oihane Sanz, Luciano C. Almeida, José Antonio, Odriozola, Mario Montes, "Highly porous hydrotalcite-like film growth on anodised aluminium monoliths", Studies in Surface Science and Catalysis, vol. 175, 2010, pp. 639-642, Available online Jul. 8, 2010.*

Liesl K. Massey, Permeability Properties of Plastics and Elastomers (Second Edition) A Guide to Packaging and Barrier Materials, A volume in Plastics Design Library 2003, Published by Elsevier Inc.*

U.S. Final Office Action, U.S. Appl. No. 14/814,620, dated Aug. 2, 2016 (9 pages).

Lei, Ziaodong, et al., "Synthesis of Oriented Layered Double Hydroxide Thin Films on Sulfonated Polystyrene Substrates," Chemistry Letters, vol. 34, No. 12, published Oct. 29, 2005 (2 pages).

English translation of Written Opinion of the International Search Authority (PCT/ISA/237) (Application No. PCT/JP2014/083215) dated Apr. 21, 2016.

Zhi Lu, et al., "Microstructure-Controlled Synthesis of Oriented Layered Double Hydroxide Thin Films: Effect of Varying the Preparation Conditions and a Kinetic and Mechanistic Study of Film Formation," Chemical Engineering Science, vol. 62, Issue 21, 2007, pp. 6069-6075.

Jae-Min Oh, et al., "The Effect of Synthetic Conditions on Tailoring the Size of Hydrotalcite Particles," Solid State Ionics, vol. 151, Issues 1-4, Nov. 2002, pp. 285-291.

Zhiyong Sun, et al., "A Structured Catalyst Based on Cobalt Phthalocyanine/Calcined Mg—Al Hydrotalcite Film for the Oxidation of Mercaptan," Green Chemistry, 2012, vol. 14, pp. 1909-1916.

Hongyun Chen et al., "In Situ Microstructure Control of Oriented Layered Double Hydroxide Monolayer Films with Curved Hexagonal Crystals as Superhydrophobic Materials," Advanced Materials, vol. 18, No. 23, Dec. 4, 2006, pp. 3089-3093.

Shifeng Li et al., "One-Step Fabrication of Oriented Mg/Al-Layered Double Hydroxide Film on Magnesium Substrate with Urea Hydrolysis and its Corrosion Resistance," Composite Interfaces, vol. 19, No. 8, Nov. 1, 2012, pp. 489-498.

Ye Kuang et al., "Morphologies, Preparations and Applications of Layered Double Hydroxide Micro-/Nanostructures," Materials, vol. 3, No. 12, Dec. 9, 2010, pp. 5220-5235.

Corresponding Japanese Office Action dated Jun. 26, 2015 (Application No. 2015-519678) (with English translation).

Corresponding International Search Report and Written Opinion (Application No. PCT/JP2014/083215) dated Mar. 10, 2015 (with English translation).

Related International Search Report and Written Opinion (Application No. PCT/JP2014/083218) dated Mar. 10, 2015 (with English translation).

Related Extended European Search Report (Application No. 14 875 447.6) dated Jan. 5, 2016.

U.S. Office Action, U.S. Appl. No. 14/814,620, dated Mar. 8, 2016 (17 pages).

Khenifi, A. Et al. "Glyphosate and glufosinate detection at electrogenerated NiAl—LDH thin films," Analytica Chimica Acta, vol. 654, pp. 97-102, dated Sep. 20, 2009 (6 pages).

Office Action, U.S. Appl. No. 14/814,620, dated Jan. 26, 2017 (13 pages).

European Office Action, European Application No. 14875447.6, dated Dec. 23, 2016 (5 pages).

European Search Report, European Application No. 14873542.6, dated Jan. 3, 2017 (7 pages).

* cited by examiner

LAYERED-DOUBLE-HYDROXIDE-CONTAINING COMPOSITE MATERIAL AND METHOD FOR PRODUCING SAME

CROSS-REFERENCE TO RELATED APPLICATIONS

This application is a continuation application of PCT/JP2014/083215 filed Dec. 16, 2014, which claims priority to Japanese Patent Application No. 2013-271993 filed Dec. 27, 2013 and Japanese Patent Application No. 2014-132581 filed Jun. 27, 2014, the entire contents all of which are incorporated herein by reference.

BACKGROUND OF THE INVENTION

1. Field of the Invention

The present invention relates to a layered-double-hydroxide-containing composite material and a method for producing the layered-double-hydroxide-containing composite material.

2. Description of the Related Art

Layered double hydroxides (hereinafter also referred to as LDHs), such as hydrotalcite, are compounds that contain exchangeable anions between hydroxide layers. To make use of their characteristics, LDHs have been used as catalysts and absorbents, as well as dispersants in polymers in order to improve heat resistance of the polymers. In particular, LDHs have recently been attracting attention as materials that exhibits hydroxide ion conductivity, and studied for use as electrolytes in alkaline fuel cells or additives in catalytic layers of zinc-air batteries.

Their traditional uses, such as catalysts, require high specific surface area, and thus it was sufficient to synthesize and use LDH powder. Meanwhile, in uses such as electrolytes in, for example, alkaline fuel cells making use of hydroxide ion conductivity, a high-density LDH membrane is desirable in order to prevent fuel gas from admixing and ensure sufficient electromotive force.

Patent Documents 1 and 2 and Non-Patent Document 1 disclose oriented LDH membranes. These oriented LDH membranes are produced by horizontally suspending the sulfonated surface of a polymer substrate in a solution that contains urea and a metal salt to cause nucleation and oriented growth of LDH. The oriented LDH membranes of these Documents each show a strong peak of (003) plane in the X-ray diffraction pattern.

CITATION LIST

Patent Document(s)

Patent Document 1: CNC1333113
Patent Document 2: WO2006/050648

Non-Patent Document(s)

Non-Patent Document 1: Zhi Lu, *Chemical Engineering Science*, 62, pp. 6069-6075 (2007), "Microstructure-controlled synthesis of oriented layered double hydroxide thin films: Effect of varying the preparation conditions and a kinetic and mechanistic study of film formation"

SUMMARY OF THE INVENTION

The present inventors have in advance successfully produced an LDH dense bulk block (hereinafter referred to as an LDH dense body). In addition, an experiment on hydroxide ion conductivity of the LDH dense body has revealed that the LDH dense body exhibits a high ion conductivity along the layers of LDH particles. Unfortunately, for the purpose of using LDH for solid electrolyte separators of alkaline secondary batteries, e.g., zinc-air batteries and nickel-zinc batteries, the LDH dense body is inadequate due to its high resistivity. For this use of LDH, it is needed to produce a thin LDH membrane that exhibits low resistivity. In this respect, the oriented LDH membranes disclosed in Patent Documents 1 and 2 and Non-Patent Document 1 are inadequate in view of their LDH orientations and density. Hence, a high density LDH membrane, preferably an oriented LDH membrane, is desired. Use of such an LDH membrane as a solid electrolyte separator further requires a porous substrate for supporting the LDH membrane to facilitate movement of hydroxide ions in the electrolyte solution through the LDH membrane.

The present inventors have currently found that an LDH-containing functional layer that has a high density of LDH and exhibits water impermeability can be formed on and/or in a porous substrate by hydrothermal treatment in an aqueous urea-containing stock solution that contains magnesium ions and aluminum ions in a specific total concentration. The present inventors have also found that this method involving the hydrothermal treatment can produce an LDH-containing functional layer of platy LDH particles oriented in a desired direction.

An object of the present invention is to provide an LDH-containing composite material including a high density LDH-containing functional layer formed on and/or in a porous substrate.

According to an aspect of the present invention, there is provided a layered-double-hydroxide-containing composite material comprising:
  a porous substrate; and
  a water impermeable functional layer on and/or in the porous substrate, the functional layer containing a layered double hydroxide represented by general formula $M^{2+}{}_{1-x}M^{3+}{}_x(OH)_2A^{n-}{}_{x/n}\cdot mH_2O$, where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents a value not less than 0.

According to another aspect of the present invention, there is provided a method for producing a layered-double-hydroxide-containing composite material, the method comprising:
  providing a porous substrate;
  soaking the porous substrate in an aqueous stock solution that contains magnesium ions ($Mg^{2+}$) and aluminum ions ($Al^{3+}$) in a total concentration of 0.20 to 0.40 mol/L and urea; and
  performing hydrothermal treatment of the porous substrate in the aqueous stock solution to form a layered-double-hydroxide-containing functional layer on and/or in the porous substrate.

According to another aspect of the present invention, there is provided a battery comprising a separator comprising the layered-double-hydroxide-containing composite material according to the above aspect.

DETAILED DESCRIPTION OF THE INVENTION

Layered-Double-Hydroxide-Containing Composite Material

Figure 1:
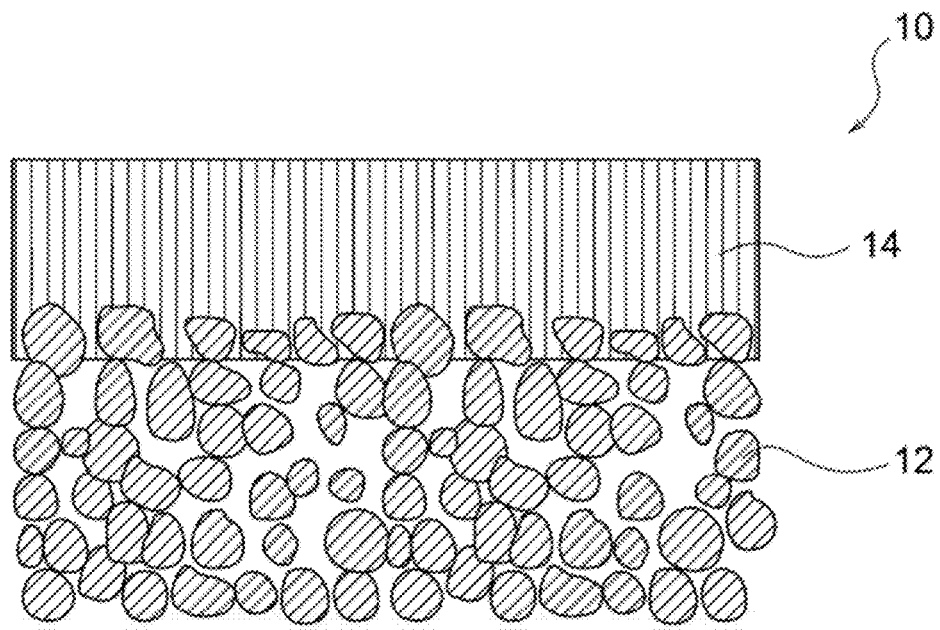
FIG. 1 is a schematic cross-sectional view of an LDH-containing composite material according to an embodiment of the present invention.

A layered-double-hydroxide-containing composite material (or an LDH-containing composite material) of the present invention comprises a porous substrate and a functional layer that is formed on and/or in the porous substrate. The functional layer contains layered double hydroxide (LDH) represented by the general formula $M^{2+}_{1-x}M^{3+}_{x}(OH)_2A^{n-}_{x/n} \cdot mH_2O$, where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents a value not less than 0). The functional layer exhibits water impermeability. The porous substrate may exhibit water permeability due to its pores, whereas the functional layer exhibits water impermeability due to a high density of LDH. Preferably, the functional layer is formed on the porous substrate. With reference to FIG. 1, a functional layer 14 as an LDH dense membrane is formed preferably on a porous substrate 12 in an LDH-containing composite material 10, for example. It should be noted that the porous substrate 12 allows LDH to be formed in pores in the surface and its vicinity of the porous substrate 12 as shown in FIG. 1. Alternatively, as in the case of an LDH-containing composite material 10' shown in FIG. 2, high density LDH may be formed in the porous substrate 12 (for example, in pores in the surface and its vicinity of the porous substrate 12), whereby at least a portion of the porous substrate 12 may constitute a functional layer 14'. The composite material 10' shown in FIG. 2 lacks a pure membrane portion of the functional layer 14 of the composite material 10 in FIG. 1. Alternatively, the functional layer 14' may have any other structure parallel to the surface of the porous substrate 12. In each embodiment of the LDH-containing composite material of the present invention, the functional layer is dense and exhibits water impermeability. Thus, the LDH-containing composite material of the present invention has unique characteristics, i.e., exhibits hydroxide ion conductivity but exhibits water impermeability.

As described above, the LDH-containing composite material of the present invention has the porous substrate which exhibits water permeability and has the dense functional layer which exhibits water impermeability. Hence, the LDH-containing composite material of the present invention as a whole exhibits hydroxide ion conductivity but exhibits water impermeability, and thus can function as a separator of a battery. LDH dense bulk blocks are not suitable for solid electrolyte separators of batteries due to their high resistivity, as described above. In contrast, the functional layer of the composite material of the present invention can be thin and have low resistivity by virtue of the porous substrate which gives strength to the composite material of the present invention. In addition, the porous substrate may exhibit water permeability, whereby the electrolyte solution can come into contact with the LDH-containing functional layer when the composite material of the present invention is used as a solid electrolyte separator of a battery. That is, the LDH-containing composite material of the present invention is very useful as a material of a solid electrolyte separator of various batteries, such as metal-air batteries (e.g., zinc-air batteries) and other zinc secondary batteries (e.g., nickel-zinc batteries). Accordingly, a preferred embodiment of the present invention provides a battery that comprises a separator comprising the layered-double-hydroxide-containing composite material of the present invention. This battery typically comprises a positive electrode, a negative electrode, an electrolyte solution, and the layered-double-hydroxide-containing composite material which comes into contact with the electrolyte solution and separates the positive electrode from the negative electrode. The battery of this embodiment is preferably a secondary battery. The secondary battery can be any one which can accept a hydroxide-ion-conductive ceramic separator. Examples of such a secondary battery include nickel-zinc secondary batteries, silver oxide-zinc secondary batteries, manganese oxide-zinc secondary batteries, zinc-air secondary batteries, and other alkali-zinc secondary batteries. Nickel-zinc secondary batteries and zinc-air secondary batteries are particularly preferred.

Preferably, the porous substrate in the composite material of the present invention is one on and/or in which the LDH-containing functional layer can be formed. The porous substrate may be composed of any material and may have any porous structure. In a typical embodiment, the LDH-containing functional layer is formed on and/or in the porous substrate. Alternatively, the LDH-containing functional layer may be formed on a non-porous substrate, and then the non-porous substrate may be modified into a porous form by any known method. In each embodiment, the porous substrate preferably has a porous structure that give water permeability to the porous substrate because, by virtue of such a porous structure, an electrolyte solution can come into contact with the functional layer in the case where the composite material is used as a separator of a battery.

The porous substrate is preferably composed of at least one selected from the group consisting of ceramics, metals and polymers. More preferably, the porous substrate is composed of a ceramic. Preferred examples of the ceramics include alumina, zirconia, titania, magnesia, spinel, calcia, cordierite, zeolite, mullite, ferrite, zinc oxide, silicon carbide, aluminum nitride, silicon nitride, and a combination thereof. Alumina, zirconia, titania, and a combination thereof are more preferred. Alumina and zirconia are further preferred, and alumina is most preferred. Use of these porous ceramic facilitates formation of a high density LDH-containing functional layer. Preferred examples of the metals include aluminum and zinc. Preferred examples of the polymers include polystyrene, polyether sulfone, polypropylene, epoxy resins, polyphenylene sulfide, and a combination thereof. The preferred materials described above all have alkali resistance, in other words, resistance to an electrolyte solution of a battery.

The porous substrate has an average pore diameter of preferably from 0.001 to 1.5 μm, more preferably from 0.001 to 1.25 μm, still more preferably from 0.001 to 1.0 μm, particularly preferably from 0.001 to 0.75 μm, and most preferably from 0.001 to 0.5 μm. These ranges make it possible to form a dense LDH-containing functional layer exhibiting water impermeability while ensuring desired water permeability in the porous substrate. Throughout the specification, the term "water impermeability" indicates that water in contact with one side of an object (i.e., the functional layer and/or the porous substrate) does not pass through to the other or opposite side during the "density evaluation test" performed in Examples described later or any other equivalent method or system. In the present invention, the average pore diameter can be measured by measuring the longest diameter of each pore in an electron microscopic image of the surface of the porous substrate. The magnification of the electron microscopic image used in this measurement is not less than 20,000. All of the measured pore diameters are listed in the ascending order from the shortest one to calculate the average, from which the subsequent 15 larger diameters and the subsequent 15 smaller diameters, i.e., 30 diameters in total, are selected in one field of view. Subsequently, the selected diameters of two fields of view are averaged to obtain the average pore diameter. The diameters can be measured by, for example, a length-measuring function of an electron microscope or an image analysis software (e.g., Photoshop, Adobe).

The surface of the porous substrate has a porosity of preferably from 10 to 60%, more preferably from 15 to 55%, and further more preferably from 20 to 50%. These ranges make it possible to form a dense LDH-containing functional layer that exhibits water impermeability while ensuring desired water permeability of the porous substrate. The surface porosity of the porous substrate is adopted because it can readily be measured by image processing described below and substantially reflects the internal porosity of the porous substrate. In other words, if the surface of the porous substrate is dense, the inside of the porous substrate is dense, too. In the present invention, the porosity at the surface of the porous substrate can be measured by a method involving image processing, in accordance with the following procedures: 1) an electron microscopic image of the surface of the porous substrate is taken at a magnification of not less than 10,000; 2) the grayscale electron microscopic image is read with an image analysis software, such as Photoshop (Adobe); 3) a monochromatic binary image is generated with tools named [image], [color compensation] and [binarization] in this order, and 4) the porosity (%) is calculated by dividing the number of pixels of the black area(s) by the number of the pixels of the whole image. Preferably, the porosity is measured over a 6 μm×6 μm area of the surface of the porous substrate by image processing. More preferably, the porosity is determined by averaging the porosity in three 6 μm×6 μm areas selected at random for objective evaluation.

The functional layer in the composite material of the present invention comprises a layered double hydroxide (LDH) represented by the general formula $M^{2+}{}_{1-x}M^{3+}{}_x(OH)_2A^{n-}{}_{x/n} \cdot mH_2O$ (where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents a value not less than 0). In addition, the functional layer exhibits water impermeability. In the general formula, $M^{2+}$ may represent any divalent cation; preferably, $M^{2+}$ represents, for example, $Mg^{2+}$, $Ca^{2+}$ and/or $Zn^{2+}$, and more preferably $Mg^{2+}$. $M^{3+}$ may represent any trivalent cation; preferably, $M^{3+}$ represents, for example, $Al^{3+}$ and/or $Cr^{3+}$, and more preferably $Al^{3+}$. $A^{n-}$ may represent any anion, and preferably, for example, $OH^-$ and/or $CO_3^{2-}$. Hence, it is preferable that, in the general formula, $M^{2+}$ comprises $Mg^{2+}$, $M^{3+}$ comprises $Al^{3+}$, and $A^{n-}$ comprises $OH^-$ and/or $CO_3^{2-}$. In the general formula, n represents an integer not less than 1, and preferably 1 or 2; x represents a value of 0.1 to 0.4, and preferably 0.2 to 0.35; and m represents a value not less than 0, and more preferably a real number or an integer more than 0 or not less than 1.

Figure 2:
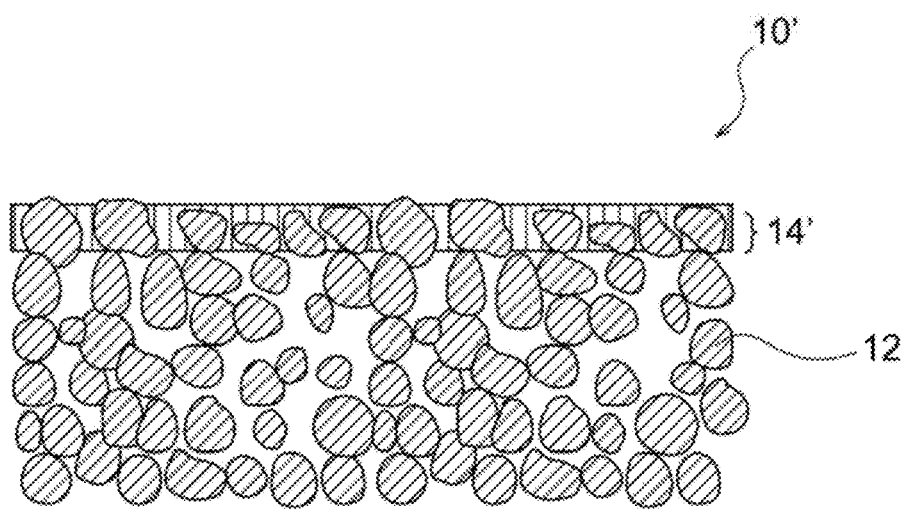
FIG. 2 is a schematic cross-sectional view of an LDH-containing composite material according to another embodiment of the present invention.

The functional layer is formed on and/or in the porous substrate, and preferably on the porous substrate. In an embodiment as shown in FIG. 1 where the functional layer 14 is formed on the porous substrate 12, the functional layer 14 is an LDH dense membrane. Typically, this LDH dense membrane consists of LDH. In an embodiment as shown in FIG. 2 where the functional layer 14' is formed in the porous substrate 12, high density LDH is formed in the porous substrate 12 (typically in pores in the surface and its vicinity of the porous substrate 12), whereby the functional layer 14' is composed of at least a portion of the porous substrate 12 and LDH. The composite material 10' and the functional layer 14' shown in FIG. 2 can be produced by removing the pure membrane portion of the functional layer 14 from the composite material 10 shown in FIG. 1 by polishing, grinding or any other known method.

The functional layer exhibits water impermeability. For example, the functional layer does not let water pass through the surface for a week during which this surface is in contact with the water at 25° C. In other words, the functional layer is composed of high density LDH and exhibits water impermeability. If local and/or incidental defects that exhibit water permeability are present in or on the functional layer, such defects may be filled with an adequate repairing material (e.g., an epoxy resin) to achieve water impermeability. Such a putty does not necessarily exhibit hydroxide ion conductivity. In each embodiment, the surface of the functional layer (typically the LDH dense membrane) has a porosity of preferably not more than 20%, more preferably not more than 15%, still more preferably not more than 10%, and most preferably not more than 7%. A lower porosity at the surface of the functional layer indicate a higher density of the functional layer (typically the LDH dense membrane), which is preferred. The high density functional layer as a hydroxide ion conductor is useful for, e.g., a functional membrane, such as a separator of a battery (e.g., a hydroxide ion conductive separator of a zinc-air battery). The surface porosity of the functional layer is adopted because it can readily be measured by image processing described below and substantially reflects the internal porosity of the functional layer. In other words, if the surface of the functional layer is dense, the inside of the functional layer is also dense. In the present invention, the porosity at the surface of the functional layer can be measured by a method involving image processing, in accordance with the following procedures: 1) an electron microscopic (SEM) image of the surface of the functional layer is taken at a magnification of not less than 10,000; 2) the grayscale SEM image is read with an image analysis software, such as Photoshop (Adobe); 3) a monochromatic binary image is generated with tools named [image], [color compensation] and [binarization] in this order; and 4) the porosity (%) is calculated by dividing the number of pixels of the black area(s) by the number of the pixels of the whole image. Preferably, the porosity is measured over a 6 μm×6 μm area of the surface of the functional layer by image processing. More preferably, the porosity is determined by averaging the porosity in three 6 μm×6 μm areas selected at random for objective evaluation.

The layered double hydroxide is composed of an agglomeration of platy particles (i.e., platy LDH particles). Preferably, these platy particles are oriented in such a manner that the tabular faces of the platy particles are substantially perpendicular to or oblique to the surface of the porous substrate (i.e., the substrate surface). This embodiment can be preferably attained especially when the functional layer 14 is formed as an LDH dense membrane on the porous substrate 12 to form the LDH-containing composite material 10 as shown in FIG. 1. This embodiment can also be attained when high density LDH is formed in the porous substrate 12 (typically, in pores in the surface and its vicinity of the porous substrate 12), whereby at least a portion of the porous substrate 12 constitutes the functional layer 14' as in the LDH composite material 10' shown in FIG. 2.

Figure 3:
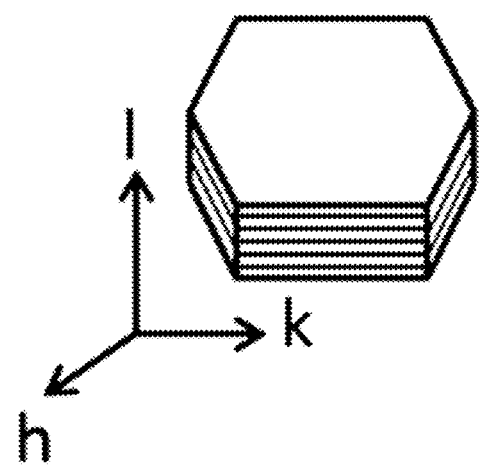
FIG. 3 is a schematic diagram of a platy particle of layered double hydroxide (LDH).

It is known that the LDH crystal has a form of a platy particle with a layered structure as shown in FIG. 3. The substantially perpendicular or oblique orientation described above is significantly beneficial for the LDH-containing functional layer (e.g., the LDH dense membrane), because an oriented LDH-containing functional layer (e.g., an oriented LDH dense membrane) exhibits anisotropic hydroxide ion conductivity, i.e., hydroxide ion conductivity along the orientation of the platy LDH particles (i.e., parallel to layers of LDH) is much greater than hydroxide ion conductivity perpendicular to the orientation of the platy LDH particles in the oriented-LDH-containing functional layer. In fact, the present inventors have revealed that, the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the substantially perpendicular or oblique orientation in the LDH-containing functional layer of the present invention fully or significantly educes the anisotropic hydroxide ion conductivity of the oriented LDH to the thickness direction of the layer (i.e., the direction perpendicular to the surface of the functional layer or the surface of the porous substrate), whereby the conductivity along the thickness direction can be maximally or significantly increased. In addition, the LDH-containing functional layer of the present invention exhibits lower resistivity than an LDH bulk block by virtue of its layered shape. The LDH-containing functional layer with such an orientation readily conducts hydroxide ions along the thickness direction of the layer. Since the LDH-containing functional layer has high density, it is significantly appropriate for use in a functional layer that requires high conductivity across the thickness of the layer and high density, such as a separator of a battery (e.g., a hydroxide ion conductive separator of a zinc-air battery).

In a particularly preferred embodiment, the LDH-containing functional layer (typically the LDH dense membrane) should be composed of the platy LDH particles highly oriented in the substantially perpendicular direction. If the platy LDH particles are highly orientated in the substantially perpendicular direction, X-ray diffractometry of the surface of the functional layer shows no peak of (003) plane or a peak of (003) plane smaller than that of (012) plane (note that this shall not apply to the case where the porous substrate shows a peak at the same angle as a peak of (012) plane of the platy LDH particles, because a peak of (012) plane of the platy LDH particles cannot be distinguished). This characteristic peak profile indicates that the platy LDH particles of the functional layer are oriented substantially perpendicular to (i.e, perpendicular to or nearly perpendicular to, and preferably perpendicular to) the functional layer. The peak of (003) plane is strongest among peaks observed in X-ray diffractometry of non-oriented LDH powder. In contrast, the oriented LDH-containing functional layer shows no peak of (003) plane or a peak of (003) plane smaller than a peak of (012) plane because platy LDH particles are oriented substantially perpendicular to the functional layer. This can be explained as follows: The c planes (001) including the (003) plane (note that 1 is 3 or 6) are parallel to the layers of platy LDH particles. If the platy LDH particles are oriented substantially perpendicular to the functional layer, the layers of platy LDH particles are also perpendicular to the functional layer and thus the X-ray diffractometry of the surface of the functional layer shows no peak or hardly shows a peak of (001) plane. The peak of (003) plane is often stronger, if present, than the peak of (006) plane, and use of the peak of (003) plane can more readily confirm the substantially perpendicular orientation than use of the peak of (006) plane. Hence, the oriented LDH-containing functional layer preferably shows no or substantially no peak of (003) plane or shows a peak of (003) plane smaller than a peak of (012) plane, which indicates that the highly perpendicular orientation is achieved. In contrast, oriented LDH membranes of Patent Documents 1 and 2 and Non-Patent Document 1 each show a strong peak of (003) plane, which indicates that the substantially perpendicular orientation is not satisfactorily achieved. In addition, the membranes of these Documents are not dense.

The thickness of the functional layer is preferably not more than 100 μm, more preferably not more than 75 μm, still more preferably not more than 50 μm, further more preferably not more than 25 μm, and most preferably not more than 5 μm. The thin functional layers having such a thinness exhibits low resistivity. The functional layer is preferably formed on the porous substrate as the LDH dense membrane. In this case, the thickness of the functional layer is the thickness of the LDH dense membrane. In the case where the functional layer is formed in the porous substrate, the thickness of the functional layer is the thickness of a composite layer composed of at least a portion of the porous substrate and LDH. In the case where the functional layer is formed on and in the porous substrate, the thickness of the functional layer is the sum of the thickness of the LDH dense membrane and the thickness of the composite layer. In each embodiment, the thickness of the functional layer having the above thinness exhibits low resistivity desirable for use in, for example, a battery. The thickness of the oriented LDH-containing functional layer does not have a lower limit, which depends on its use. In order to ensure hardness desirable for use in a functional layer, such as a separator, the thickness is preferably not less than 1 μm, and more preferably not less than 2 μm.

Production of Layered-Double-Hydroxide-Containing Composite Material

The layered-double-hydroxide-containing composite material (LDH-containing composite material) can be produced by: (1) preparing a porous substrate; (2) soaking the porous substrate in an aqueous stock solution that contains magnesium ions ($Mg^2$) and aluminum ions ($Al^{3+}$) in a total concentration of 0.20 to 0.40 mol/L and urea; and (3) hydrothermally treating the porous substrate in the aqueous stock solution to form a layered-double-hydroxide-containing functional layer on and/or in the porous substrate.

(1) Preparation of Porous Substrate

The porous substrate is one as described above. Preferably, the porous substrate is composed of at least one selected from the group consisting of ceramics, metals, and polymers. More preferably, the porous substrate is composed of a ceramic. Preferred examples of the ceramics include alumina, zirconia, titania, magnesia, spinel, calcia, cordierite, zeolite, mullite, ferrite, zinc oxide, silicon carbide, aluminum nitride, silicon nitride, and a combination thereof. Alumina, zirconia, titania and a combination thereof are more preferred. Alumina and zirconia are further preferred, and alumina is most preferred. Use of these porous ceramic facilitates the formation of the high density LDH-containing functional layer. In the case of a ceramic porous substrate, the porous substrate is preferably cleaned, for example, by ultrasonic cleaning or with ion-exchanged water.

In the case of a polymer porous substrate, the surfaces of the polymer are preferably anionized in advance. The anionized surface facilitates the nucleation of LDH at its anionic groups and also facilitates growth and the substantially perpendicular orientation of platy LDH particles in subsequent steps. The polymer substrate having anionized surfaces can be prepared by anionizing an anionizable polymer substrate by any known method. Anionization is performed preferably by imparting at least one of $SO_3^-$ (sulfonation), $OH^-$ (hydroxylation) and $CO_2^-$ (carboxylation), which can be an anion in LDH, to the surface of a polymer substrate. Sulfonation is more preferred. The anionizable polymer substrate preferably has alkali resistance, i.e., resistance to an electrolyte solution of a battery. The anionizable polymer substrate is preferably composed of at least one selected from the group consisting of polystyrene, polyether sulfone, polypropylene, epoxy resins, and poly(phenylene sulfide), which are particularly suitable for sulfonation. Aromatic polymer substrates are particularly preferred because they are readily anionized (particularly, sulfonated). Examples of the aromatic polymer substrates include substrates composed of at least one selected from the group consisting of polystyrene, polyether sulfone, polypropylene, an epoxy resin, and poly(phenylene sulfide). Most preferably, the aromatic polymer substrate is composed of polystyrene. The sulfonation may be performed by soaking a sulfonatable polymer substrate in an acid for sulfonating the sulfonatable polymer substrate, such as sulfuric acid (e.g., concentrated sulfuric acid), fuming sulfuric acid, chlorosulfuric acid, and sulfuric anhydride. Any other sulfonation techniques may also be used. The soaking in an acid for the sulfonation may be performed at room temperature or high temperature (e.g., 50 to 150° C.). The sulfonated aromatic polymer substrate shows a transmittance ratio $T_{1601}/T_{1127}$ of preferably not less than 0.920, more preferably not less than 0.930, and more preferably not less than 0.940, where the ratio $T_{1601}/T_{1127}$ is calculated by dividing the transmittance at 1601 $cm^{-1}$ (i.e., $T_{1601}$) assigned to C=C stretching vibration of the phenyl group by the transmittance at 1127 $cm^{-1}$ (i.e., $T_{1127}$) assigned to the sulfonate group in the transmittance spectrum of the sulfonated surface of the aromatic polymer substrate measured by attenuated total reflection (ATR) of Fourier transform infrared spectroscopy (FT-IR) on the surface. In the transmittance spectrum, the absorption peak at 1601 $cm^{-1}$ is assigned to C=C stretching vibration of the phenyl group, and thus the transmittance $T_{1601}$ always has the same value, regardless of the presence or absence of the sulfonate group. In contrast, the absorption peak at 1127 $cm^{-1}$ is assigned to the sulfonate group, and thus the transmittance $T_{1127}$ has a lower value when the density of the sulfuric acid is higher. Thus, a higher $T_{1601}/T_{1127}$ indicates that more sulfonate groups are densely present on the surface of the polymer substrate, and also indicates that nuclei of LDH that has taken the sulfonate groups as anions of an intermediate layer can be densely formed, which contributes formation of the high density LDH-containing functional layer. The ratio $T_{1601}/T_{1127}$ can have the above-mentioned value by adjusting the soaking time in an acid for the sulfonation of the polymer substrate. For example, in the case of using concentrated sulfuric acid in the sulfonation, the soaking time is preferably not less than 6 days, and more preferably not less than 12 days. The anionized polymer substrate described above is preferably cleaned with ion-exchanged water and then dried at room temperature or high temperature (e.g., 30 to 50° C.).

(2) Soaking in Aqueous Stock Solution

Subsequently, the porous substrate is soaked in an aqueous stock solution in a target direction (preferably horizontally or perpendicularly). To horizontally retain the porous substrate, the porous substrate may be hanged up in, suspended in or put on the bottom of a container of the aqueous stock solution. For example, the porous substrate may be immobilized and suspended in the stock solution and away from the bottom of the solution container. To perpendicularly retain the porous substrate, a fixture may be disposed that can holds the porous substrate perpendicularly to the bottom of the solution container. In each embodiment, a preferred configuration or arrangement is one that forms LDH substantially perpendicular (i.e., grows platy LDH particles oriented in such a manner that the tabular faces of the platy particles are substantially perpendicular to or oblique to the surface of the porous substrate) over, on and/or in the porous substrate. The aqueous stock solution contains magnesium ions ($Mg^{2+}$) and aluminum ions ($Al^{3+}$) in a certain total concentration and urea. Urea is hydrolyzed into ammonia and raises the pH of the aqueous stock solution, and metal ions co-existing in the aqueous stock solution are converted into hydroxides, whereby LDH is formed. The urea hydrolysis, which also generates carbon dioxide, can form LDH having carbonate ions as anions. The aqueous stock solution contains magnesium ions ($Mg^{2+}$) and aluminum ions ($Al^{3+}$) in a total concentration of preferably 0.20 to 0.40 mol/L, more preferably 0.22 to 0.38 mol/L, further more preferably 0.24 to 0.36 mol/L, and most preferably 0.26 to 0.34 mol/L. These concentration ranges facilitate the nucleation and the crystal growth in a balanced manner and can form a highly-oriented high-density LDH-containing functional layer. At a low total concentration of magnesium ions and aluminum ions, the crystal growth dominates over the nucleation, resulted in a decrease in the number of the LDH particles and an increase in the size of the LDH particles. At a high total concentration, the nucleation dominates over the crystal growth, resulted in an increase in the number of the LDH particles and a decrease in the size of the LDH particles.

The aqueous stock solution preferably contains dissolved magnesium nitrate and aluminum nitrate, and the aqueous stock solution thereby contains nitrate ions in addition to the magnesium ions and the aluminum ions. In this case, a molar ratio of the urea to the nitrate ions ($NO_3^-$) (i.e., urea/$NO_3^-$) in the aqueous stock solution ranges preferably from 2 to 6, and more preferably from 4 to 5.

(3) Formation of LDH-Containing Functional Layer by Hydrothermal Treatment

In the next stage, hydrothermal treatment of the porous substrate is performed in the aqueous stock solution to form the LDH-containing functional layer on and/or in the porous substrate. The hydrothermal treatment is performed in a sealed container at a temperature of preferably 60 to 150° C., more preferably 65 to 120° C., further more preferably 65 to 100° C., and most preferably 70 to 90° C. The hydrothermal treatment temperature may have any upper limit within the scope not causing thermal deformation of the porous substrate (e.g., the polymer substrate). The temperature can be raised at any rate in the hydrothermal treatment. The heating rate may range from 10 to 200° C./h, preferably from 100 to 200° C./h, and more preferably from 100 to 150° C./h. The time for the hydrothermal treatment may be determined depending on a target density and a target thickness of the LDH-containing functional layer.

After the hydrothermal treatment, the porous substrate is taken out from the sealed container, and then preferably cleaned with ion-exchanged water.

The resulting LDH-containing functional layer of the LDH-containing composite material is composed of densely assembled platy LDH particles that are oriented in the substantially perpendicular direction, which direction is beneficial for the conductivity. In the case of using the LDH-containing functional layer that is dense and has sufficient gas-tight property in batteries, such as zinc-air batteries, the electricity generating capacity will increase. Furthermore, this dense LDH-containing functional layer is expected to be applicable to novel applications, such as a separator that can prevent zinc dendrite growth and carbon dioxide incorporation, which have been large technical barriers against forming a zinc-air secondary battery containing an electrolyte solution that has not been achieved. This dense LDH-containing functional layer can also be used in a separator of a nickel-zinc battery which has been known to cause growth of zinc dendrite growth being an obstacle for practical use of this battery.

The LDH-containing functional layers can be formed on and/or in both surfaces of the porous substrate by the above-described method. To produce the LDH-containing composite material in a shape suitable for a separator, machine grinding of a LDH-containing functional layer on one surface of the porous substrate is preferably performed after the formation of the LDH-containing functional layers. Alternatively, it is desirable to take a measure so that the LDH-containing functional layer cannot be formed on one surface of the porous substrate.

EXAMPLES

The present invention will be described in more detail by way of Examples below.

Example A1

(1) Preparation of Porous Substrate

<Samples 1 to 3>

Boehmite (Sasol Limited, DISPAL 18N4-80), methyl cellulose, and ion-exchanged water were weighed to give a ratio by weight of (boehmite):(methyl cellulose):(ion-exchanged water) equal to 10:1:5, and were then kneaded. The kneaded product was subjected to extrusion molding with a hand press machine into a size of 2.5 cm×10 cm×0.5 cm in thickness. The resulting green body was dried at 80° C. for 12 hours and fired at each temperature shown in Table 1 for 3 hours to prepare an alumina porous substrate. Subsequent to the firing, the alumina porous substrate was shaped into a size of 2 cm×2 cm×0.3 cm.

<Samples 4 and 5>

Zirconia (TOSOH Corporation, TZ-3YS (for Sample 4) or TZ-8YS (for Sample 5)), methyl cellulose, and ion-exchanged water were weighed to give a ratio by weight of (zirconia):(methyl cellulose):(ion-exchanged water) equal to 10:1:5, and then were kneaded. The kneaded product was subjected to extrusion molding with a hand press machine into a size of 2.5 cm×10 cm×0.5 cm in thickness. The resulting green body was dried at 80° C. for 12 hours and fired at each temperature shown in Table 1 for 3 hours to prepare a zirconia porous substrate. Subsequent to the firing, the zirconia porous substrate was shaped into a size of 2 cm×2 cm×0.3 cm.

Figure 4:
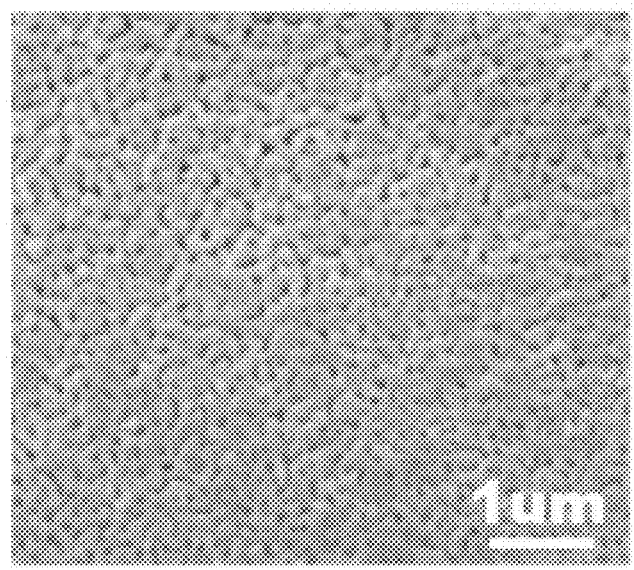
FIG. 4 shows a SEM image of the surface of a porous alumina substrate prepared in Example A1.

The porosity at the surface of the resulting porous substrate was measured by a method involving image processing and the results are shown in Table 1. This measurement of the porosity was performed by the following procedures: 1) electron microscopic images of the surface microstructures of the porous substrate samples were taken with a field emission scanning electron microscope (FE-SEM) for sample 1 and a scanning electron microscope (SEM; JSM-6610LV, JEOL Ltd.) for samples 2 to 5 at a magnification of not less than 10,000 for other than sample 1 and a magnification of 100,000 for sample 1 at an acceleration voltage of 1 kV for sample 1 and 10 to 20 kV for samples 2 to 5; 2) the grayscale electron microscopic images were read with an image analysis software, such as Photoshop (Adobe); 3) monochromatic binary images were generated with tools named [image], [color compensation] and [binarization] in this order; and 4) the porosity (%) was calculated by dividing the number of pixels of the black areas by the number of the pixels of the whole image for each sample. The porosity was measured over a 600 nm×600 nm area of the surface of the porous substrate for sample 1 and a 6 μm×6 μm area of the surfaces of the porous substrates for samples 2 to 5. The SEM image of the surface of the porous substrate is shown in FIG. 4.

Average pore diameters of the porous substrates were also measured, and are shown in Table 1. The average pore diameters were obtained by measuring the longest diameter of each pore in an electron microscopic image (i.e., a FE-SEM image or a SEM image). In this measurement, magnifications of the electron microscopic images were 100,000 for Sample 1 and 20,000 for Samples 2 to 5. All of the measured pore diameters were listed in the ascending order from the smallest one to calculate the average, from which the subsequent 15 larger diameters and the subsequent 15 smaller diameters, i.e., 30 diameters in total, were selected in one field of view. Subsequently, the selected diameters of two fields of view were averaged to obtain the average pore diameter. The diameters were measured by the length-measuring function of the FE-SEM or SEM.

(2) Cleaning of Porous Substrate

The resulting porous substrates were ultrasonically cleaned in acetone for 5 minutes, and then in ethanol for 2 minutes, and subsequently in ion-exchanged water for 1 minute.

(3) Preparation of Aqueous Stock Solution

Magnesium nitrate hexahydrate ($Mg(NO_3)_2 \cdot 6H_2O$, KANTO CHEMICAL Co., Inc.), aluminum nitrate nonahydrate ($Al(NO_3)_3 \cdot 9H_2O$, KANTO CHEMICAL Co., Inc.), and urea (($NH_2)_2CO$, Sigma-Aldrich Corporation) were prepared as raw materials for an aqueous stock solution. Magnesium nitrate hexahydrate and aluminum nitrate nonahydrate were weighed and put in a beaker, and then ion-exchanged water was added to the beaker to give a total volume of 75 ml, a ratio of the cations ($Mg^{2+}/Al^{3+}$) of 2 and a molar concentration of the total metal ions (i.e., $Mg^{2+}$ and $Al^{3+}$) of 0.320 mol/L. The resulting solution was stirred, and then urea was added to the solution. The added urea was weighed in advance to give a ratio urea/$NO_3^-$ of 4. The resulting solution was stirred again. In this way an aqueous stock solution was prepared.

(4) Formation of Membrane by Hydrothermal Treatment

The aqueous stock solution prepared in the above procedure (3) and the porous substrate cleaned in the above procedure (2) were enclosed together in a sealed Teflon (registered trademark) container (with an internal volume of 100 mL and a stainless steel jacket). The porous substrates were horizontally suspended and away from the bottom of the sealed Teflon (registered trademark) container in such a manner that both surfaces of the porous substrates came into contact with the aqueous stock solution. In the next stage, hydrothermal treatment was performed at a hydrothermal temperature of 70° C. for 168 hours (i.e., 7 days) to form oriented layered double hydroxide membranes (i.e., functional layers). After a predetermined time, the porous substrates were taken from the sealed container. The porous substrates were then cleaned with ion-exchanged water and dried at 70° C. for 10 hours to form dense membranes of the layered double hydroxide (or LDH) on the respective porous substrates (hereinafter these dense membranes are referred to as sample membranes 1 to 5). The thickness of each sample membrane was about 1.5 µm. In this way layered-double-hydroxide-containing composite materials (hereinafter referred to as sample composite materials 1 to 5) were prepared. Each porous substrate had the LDH membranes on both sides. To form the composite material suitable for a separator, the LDH membrane on one side of the porous substrate was mechanically ground.

Example A2: Identification of Sample Membrane

Figure 5:
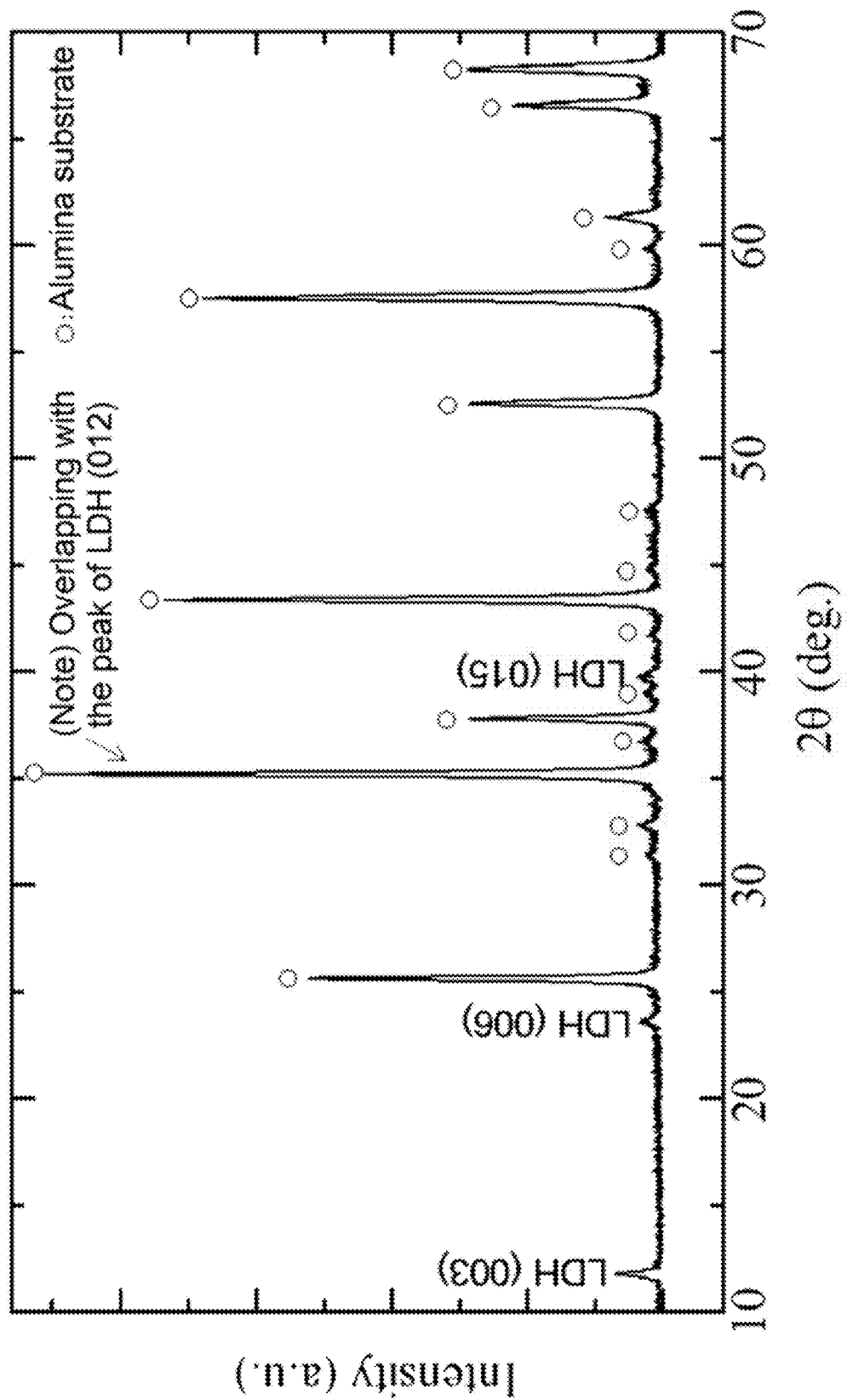
FIG. 5 shows an XRD profile of a crystalline phase of a sample in Example A2.

A crystalline phase of sample membrane 2 was identified with an X-ray diffractometer (RINT-TTR III, Rigaku Corporation) at a voltage of 50 kV, a current of 300 mA, and a measuring range of 10° to 70°. The resulting XRD profile is shown in FIG. 5. This XRD profile was compared with the diffraction peaks of a layered double hydroxide (or a hydrotalcite compound) described in JCPDS card No. 35-0964, and sample membrane 2 was identified as a layered double hydroxide (LDH, or a hydrotalcite compound). As shown in the XRD profile of FIG. 5, peaks derived from alumina in the porous substrate on which sample membrane 2 was formed (i.e., the peaks marked with a circle) were also observed. Sample membranes 1 and 3 to 5 were also identified as a layered double hydroxide (LDH, or a hydrotalcite compound).

Example A3: Observation of Microstructure

Figure 6:
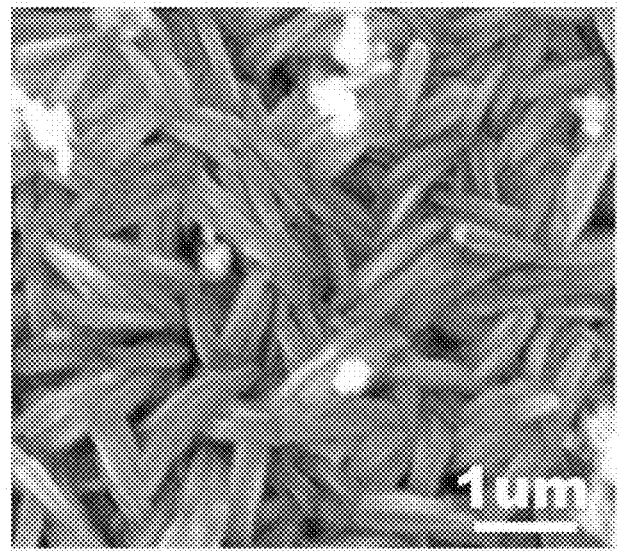
FIG. 6 shows a SEM image of a surface microstructure of a sample membrane in Example A3.

The surface microstructure of sample membrane 2 was observed with a scanning electron microscope (SEM; JSM-6610LV, JEOL Ltd.) at an acceleration voltage of 10 to 20 kV. The resulting SEM image (i.e., a secondary electron image) of the surface microstructure of sample membrane 2 is shown in FIG. 6.

Figure 7:
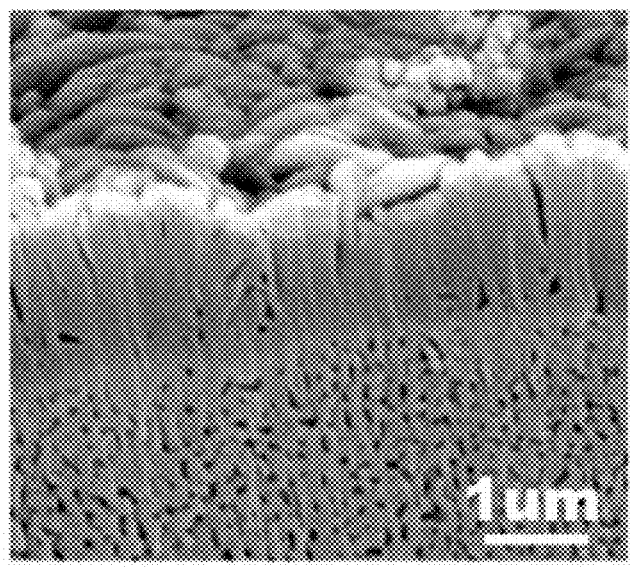
FIG. 7 shows a SEM image of a microstructure at a polished cross-sectional surface of a sample composite material in Example A3.

A polished cross-section was prepared by CP polishing of a cross-section of sample composite material 2. The microstructure at this polished cross-section was observed with a scanning electron microscope (SEM) at an acceleration voltage of 10 to 20 kV. The resulting SEM image of the polished cross-section of sample composite material 2 is shown in FIG. 7.

Example A4: Measurement of Porosity

The porosity of the surface of sample membrane 2 was measured by a method involving image processing. This measurement of the porosity was performed by the following procedures: 1) an electron microscopic image of the surface microstructure of the sample membrane was taken at an acceleration voltage of 10 to 20 kV and at a magnification of not less than 10,000 with a scanning electron microscope (SEM; JSM-6610LV, JEOL Ltd.); 2) the grayscale SEM image was read with an image analysis software, such as Photoshop (Adobe); 3) a monochromatic binary image was generated with tools named [image], [color compensation] and [binarization] in this order; and 4) the porosity (%) was calculated by dividing the number of pixels of the black areas by the number of the pixels of the whole image. This porosity was measured over a 6 µm×6 µm area of the surface of the sample membrane. The measured porosity was 19.0%. This porosity was used to calculate the density D (hereinafter referred to as a membrane surface density) of the surface of the sample membrane by the equation D=100%−(the porosity at the surface of the membrane). The density D was 81.0%.

The porosity at the polished cross-section of membrane sample 2 was also measured. This porosity was measured as in Example A3 except for taking an electron microscopic image (i.e., a SEM image) of the polished cross-section along the thickness direction of the membrane at a magnification of not less than 10,000. This measurement of the porosity was performed on the area of the sample membrane of the polished cross-section. The porosity at the polished cross-section of sample membrane 2 was 3.5% on average (i.e., the porosity of the membrane areas of the three polished cross-sections was averaged). The results demonstrate a significantly high density of the membrane formed on the porous substrate.

Example A5: Evaluation of Density

Figure 8A:
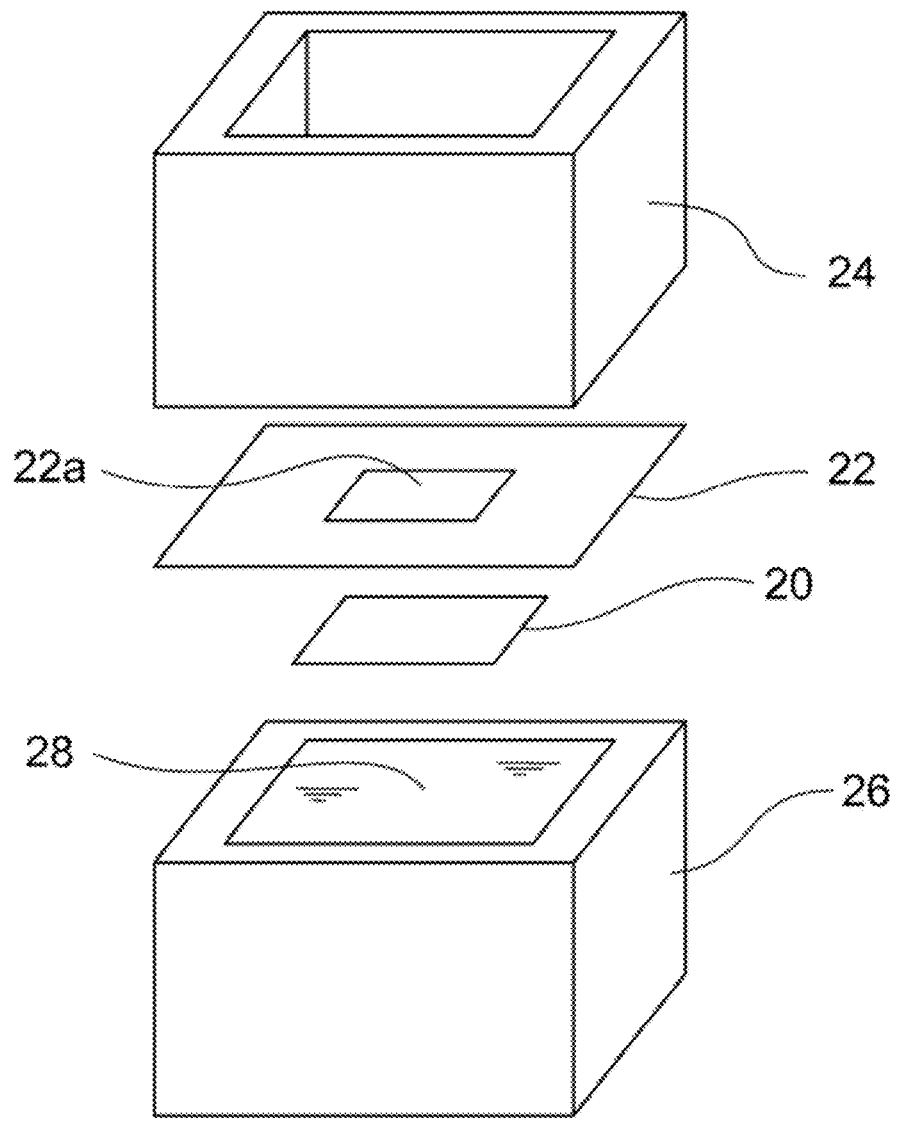
FIG. 8A is an exploded perspective view of a system for evaluating and measuring density in Example A5.
Figure 8B:
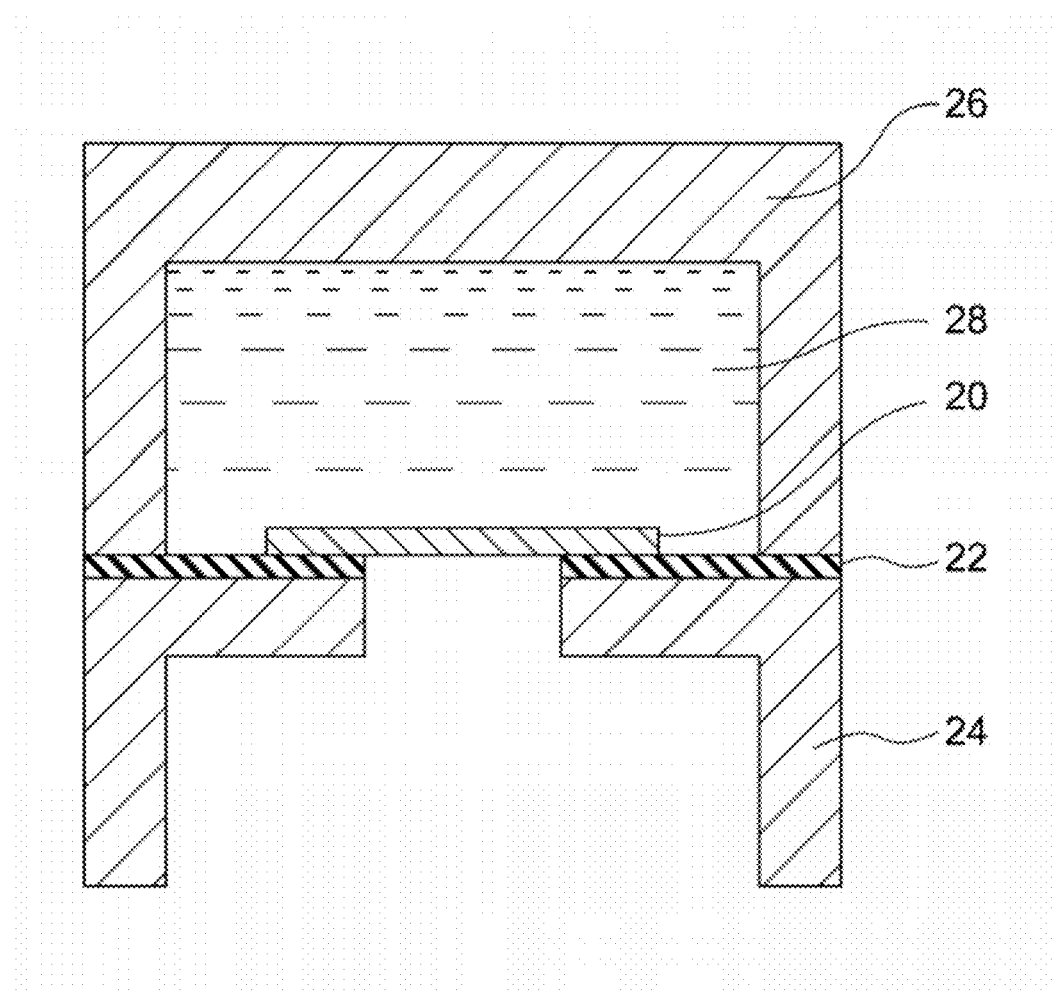
FIG. 8B is a schematic cross-sectional view of a system for evaluating and measuring density in Example A5.

To confirm that sample membranes 1 to 5 were dense and had water impermeability, a density evaluation test was performed on sample membranes 1 to 5. FIG. 8A illustrates that a silicone rubber 22 having a 0.5 cm×0.5 cm opening 22a at its center was bonded to the sample membrane on sample composite material 20 prepared in Example A1 (note that a 1 cm×1 cm area of the sample composite material 20 was used). The resulting laminate was then disposed between two quadratic hollow acrylic units 24 and 26 and bonded to these acrylic units. The acrylic unit 24 disposed on the silicone rubber 22 had no bottom, whereby the silicone rubber 22 was bonded to the acrylic unit 24 and the opening 22a was exposed. The acrylic unit 26 disposed on the porous substrate of sample composite material 20 had a bottom and contained ion-exchanged water 28. That is, these components were arranged to form an assembly so that, when the assembly was inverted up side down, the ion-exchanged water 28 came into contact with the porous substrate of sample composite material 20. The assembly was weighed, and then inverted as illustrated in FIG. 8B and left for a week at 25° C., followed by weighing the assembly again. Before weighing the assembly, water drops on the inner side(s) of the acrylic unit 24 were wiped, if any. The density was evaluated based on the difference between the weights of the assembly before and after the inversion. Each sample membrane gave no difference in the weight of the ion-exchanged water before and after the one-week leaving at 25° C. That is, sample membranes 1 to 5, i.e., functional membranes, were dense and thus had water impermeability.

TABLE 1

| Sample No. | Porous substrate | | | | LDH Membrane Water permeability (functional layer) |
|---|---|---|---|---|---|
| | Substrate composition | Firing temperature (° C.) | Pore diameter (μm) | Porosity (%) | |
| 1 | Alumina | 1100 | 0.02 | 27.2 | No |
| 2 | Alumina | 1150 | 0.1 | 24.6 | No |
| 3 | Alumina | 1200 | 0.6 | 19.3 | No |
| 4 | Zirconia (3YSZ) | 1100 | 0.3 | 44.5 | No |
| 5 | Zirconia (8YSZ) | 1100 | 0.2 | 51.9 | No |

Examples B1 to B4 (Reference Examples)

The following Examples are preparation of oriented layered-double-hydroxide-containing membranes on non-porous substrates. These examples do not fall into the present invention but are regarded as reference examples, and a non-porous substrate of the following reference example can be replaced with a desired porous substrate to produce a layered-double-hydroxide-containing composite material of the present invention.

Example B1 (Reference): Preparation of Oriented Layered-Double-Hydroxide-Containing Membrane (1) Sulfonation of Substrate Polystyrene plates having a size of 26.5 mm×30.0 mm×1.85 mm were prepared as aromatic polymer substrates having sulfonatable surfaces. The surfaces of the polystyrene plates were cleaned by wiping with ethanol. The cleaned polystyrene plates were then soaked in a commercially-available concentrated sulfuric acid (conc. not less than 95.0% by weight, KANTO CHEMICAL Co., Inc.) in a sealed container at room temperature. After the soaking times shown in Table 2, the polystyrene plates were taken from the concentrated sulfuric acid, and then cleaned with ion-exchanged water. The cleaned polystyrene plates were dried at 40° C. for 6 hours. In this way the polystyrene plates having sulfonated surfaces were prepared as substrates for samples 1 to 17. In addition, a polystyrene plate without sulfonated surfaces was prepared as a substrate for comparative sample 18.

Figure 9:
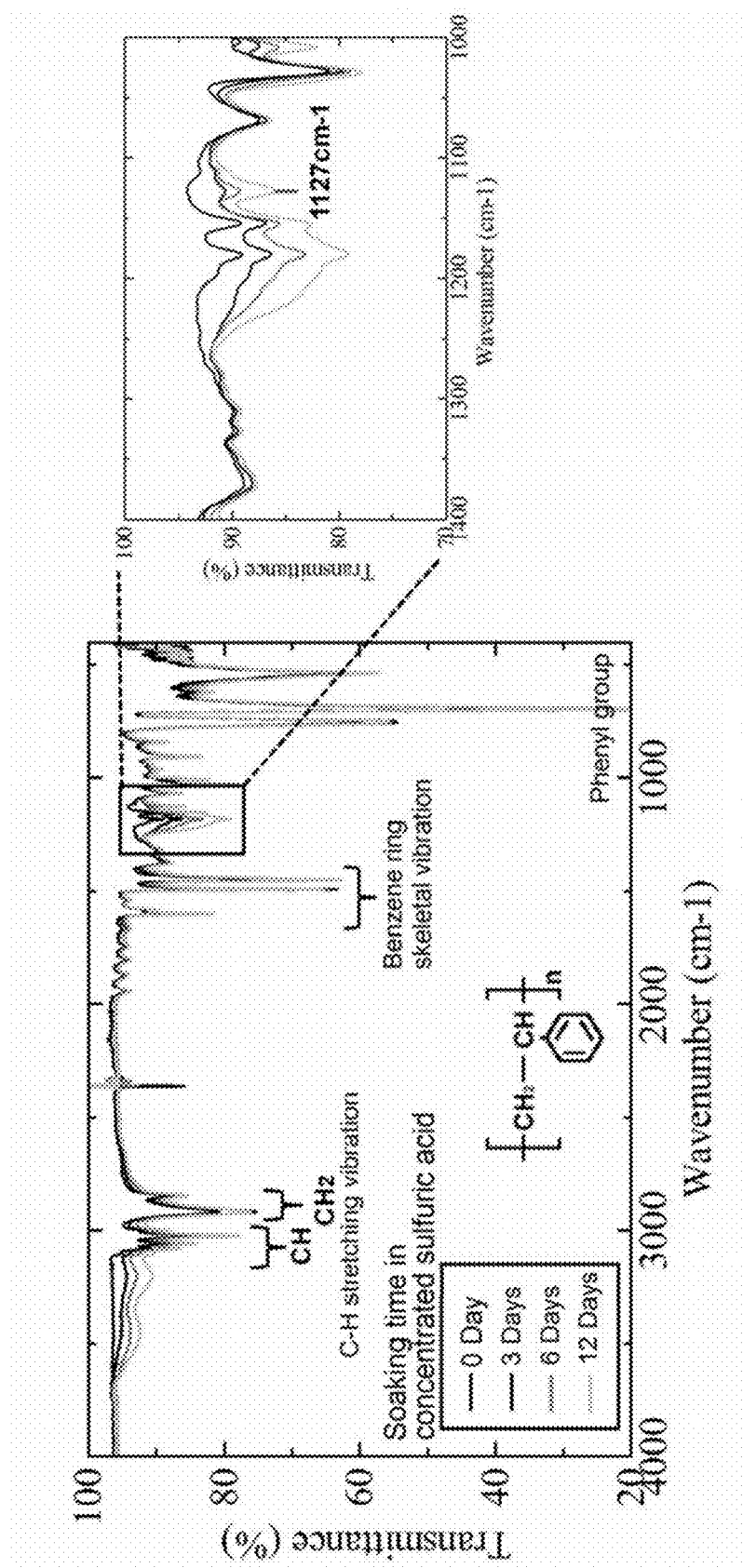
FIG. 9 shows transmission spectrum of sulfonated polystyrene plates prepared by soaking in concentrated sulfuric acid for different times in Example B1, taken by an ATR method of FT-IR.

Before and after the sulfonation, transmission spectra of the polystyrene plate were obtained by attenuated total reflection (ATR) of Fourier transform infrared spectroscopy (FT-IR) to detect an absorption peak assigned to the sulfonate group. In this measurement, transmission spectrum at a measuring range of 4000 to 400 cm$^{-1}$ was obtained for 64 times in total with a horizontal ATR device of an FT-IR device for each sample and background. The transmission spectrum of the polystyrene plates which were prepared by different soaking times are shown in FIG. 9. FIG. 9 demonstrates that the sulfonated polystyrene plates have an absorption peak at 1127 cm$^{-1}$ assigned to the sulfonate group, which does not appear in the non-sulfonated polystyrene plate, and this peak becomes stronger as the soaking time increases. On the ground that the measured areas are all the same, it is considered that a longer soaking time in concentrated sulfuric acid leads to a higher amount (i.e., density) of the sulfonate group. In addition, the ratio of transmittance peaks (i.e., $T_{1601}/T_{1127}$), that is, the ratio of the peak transmittance at 1601 cm$^{-1}$ (i.e., $T_{1601}$) assigned to C=C stretching vibration of the phenyl group (in a benzene ring skeleton), which does not change by sulfonation, to the peak transmittance at 1127 cm$^{-1}$ (i.e., $T_{1127}$) assigned to the sulfonate group was calculated from the transmission spectrum obtained by the ATR method. The calculated ratios are shown in Table 2, and demonstrate that the longer soaking time leads to an increase in the content of the sulfonate group.

TABLE 2

| Soaking time in conc. sulfuric acid (day) | Peak transmittance at 1601 cm$^{-1}$ assigned to C=C stretching vibration of phenyl group $T_{1601}$(%) | Peak transmittance at 1127 cm$^{-1}$ assigned to the sulfonate group $T_{1127}$(%) | Peak ratio $T_{1601}/T_{1127}$ |
|---|---|---|---|
| 0 | 81.585 | 94.206 | 0.866 |
| 3 | 80.154 | 89.660 | 0.894 |
| 6 | 81.439 | 88.457 | 0.921 |
| 12 | 79.844 | 84.845 | 0.941 |

(2) Preparation of Aqueous Stock Solution

Magnesium nitrate hexahydrate (Mg(NO$_3$)$_2$.6H$_2$O, KANTO CHEMICAL Co., Inc.), aluminum nitrate nonahydrate (Al(NO$_3$)$_3$.9H$_2$O, KANTO CHEMICAL Co., Inc.), and urea ((NH$_2$)$_2$CO, Sigma-Aldrich Corporation) were prepared as raw materials for aqueous stock solutions. Magnesium nitrate hexahydrate and aluminum nitrate nonahydrate were weighed and put in a beaker, and then ion-exchanged water was added to the beaker to give a total volume of 75 ml, ratios of the cations (Mg$^{2+}$/Al$^{3+}$) shown in Table 3 and molar concentrations of the total metal ions (i.e., Mg$^{2+}$ and Al$^{3+}$) shown in Table 3. The resulting solutions were stirred, and then urea was added to the solutions. The added urea was weighed in advance to give ratios shown in Table 3. The resulting solutions were stirred again. In this way aqueous stock solutions were prepared.

(3) Formation of Membrane by Hydrothermal Treatment

Each stock solution prepared in procedure (2) and each sulfonated substrate prepared in procedure (1) were enclosed together in a sealed Teflon (registered trademark) container (with an internal volume of 100 mL and a stainless steel jacket). The substrate was spontaneously suspended in a horizontal posture in the stock solution. In the next stage, hydrothermal treatment was performed under conditions of a hydrothermal temperature, a hydrothermal time and a heating rate shown in Table 3 to form oriented layered double hydroxide membranes on the substrate. After a predetermined time, the substrate was taken from the sealed container. The substrate was then cleaned with ion-exchanged water and dried at 70° C. for 10 hours to form membranes of the layered double hydroxide (or LDH). In this way samples 1 to 18 were prepared. Samples 1 to 17 were in a shape of membrane, and each had a thickness of about 2 μm. In contrast, sample 18 did not have a shape of membrane.

Example B2 (Reference): Evaluation of Orientation

Crystalline phases of samples 1 to 18 were analyzed with an X-ray diffractometer (D8 ADVANCE, Bruker AXS) at a voltage of 40 kV, a current of 40 mA and a measuring range of 5° to 70°. The resulting XRD profiles were compared with the diffraction peaks of a layered double hydroxide (or a hydrotalcite compound) described in JCPDS card No. 35-0964, and samples 1 to 17 were identified as a layered double hydroxide (or a hydrotalcite compound).

Figure 10:
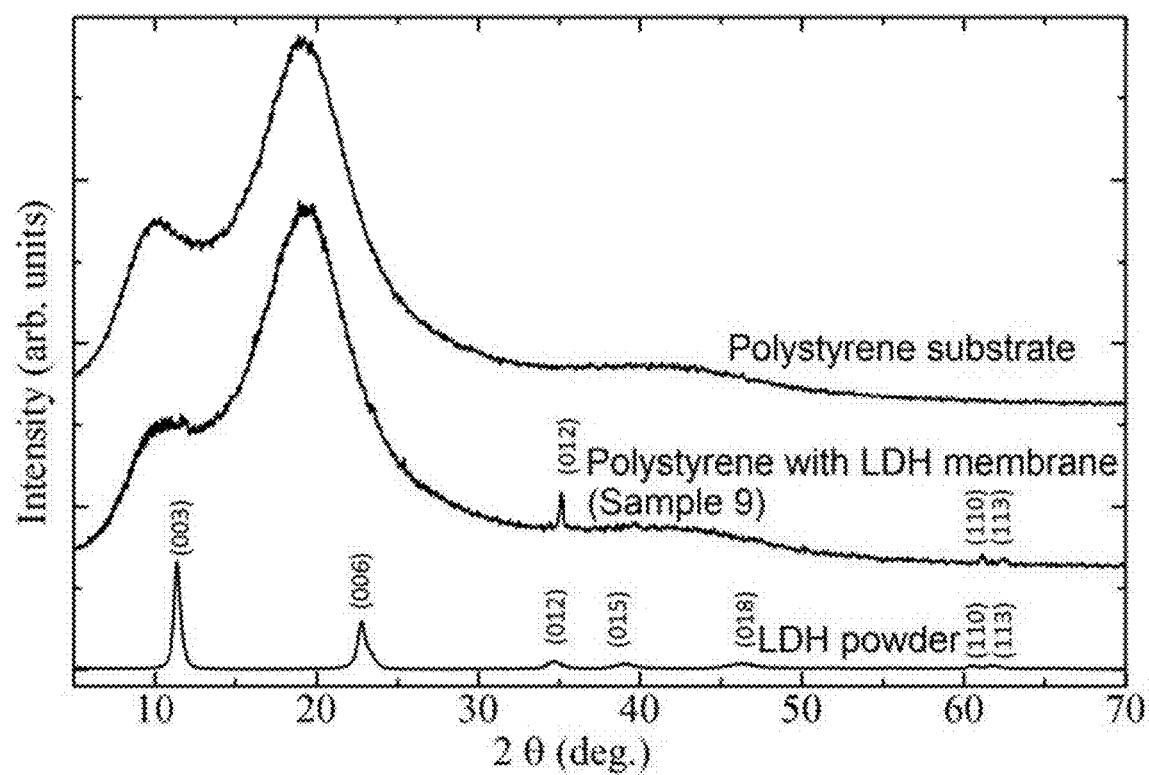
FIG. 10 shows an XRD profile of a crystalline phase of sample 9 in Example B2.

In the next stage, the degree of crystallographic orientation of each LDH membrane was investigated using the XRD profile. For a simple explanation, the XRD profile of the crystalline phase of sample 9, which had the highest membrane density, is shown in FIG. 10. In FIG. 10, the profile at the top is assigned to the crystalline phase of the polystyrene substrate, the phase in the middle is assigned to the crystalline phase of the polystyrene substrate having the LDH membranes, and the phase at the bottom is assigned to the crystalline phase of the LDH powder. The LDH powder exhibited a strongest peak of (003) plane, whereas the oriented LDH membrane exhibited weaker peaks of (001) planes (1 is 3 and 6) and exhibited peaks of (012) and (110) planes. This result demonstrates that loss of peaks of (001) planes indicates the platy particles are orientated substantially perpendicular to (i.e., perpendicular to or nearly perpendicular to) the substrate.

The crystallographic orientations of samples 1 to 8 and 10 to 18 were also investigated as in sample 9. The crystallographic orientations were rated on a scale of A to C. The results are shown in Table 3.
<Evaluation Criteria of Crystalline Orientation>
A: no peak of (003) plane was observed or the intensity of a peak of (003) plane was not more than 50% of that of a peak of (012) plane;
B: the intensity of a peak of (003) plane ranged from 50% to 100% of that of a peak of (012) plane;
C: the intensity of a peak of (003) plane was stronger than that of a peak of (012) plane.

Example B3 (Reference): Observation of Microstructure

Figure 11:
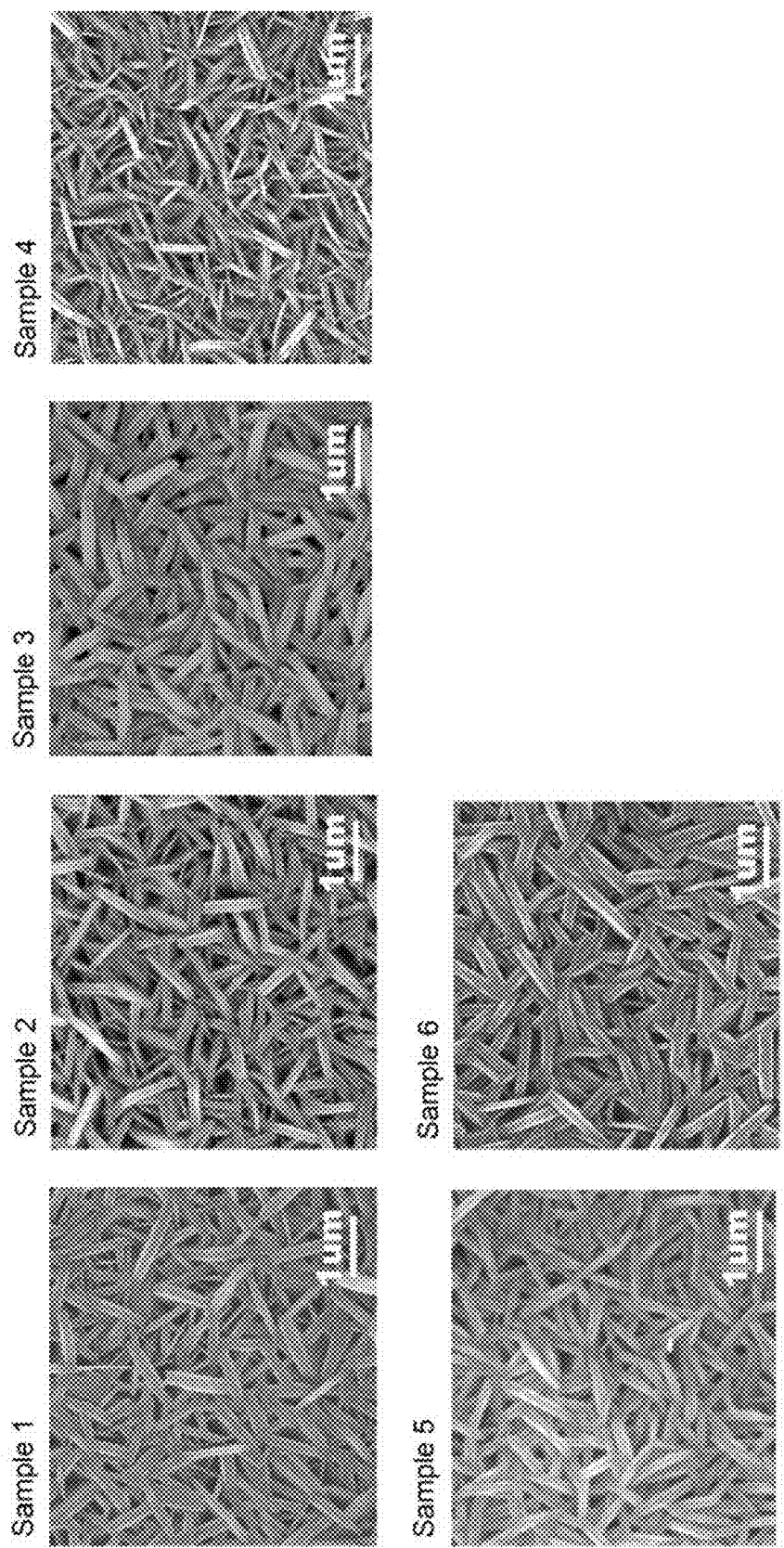
FIG. 11 shows SEM images of surface microstructures of samples 1 to 6 in Example B3.
Figure 12:
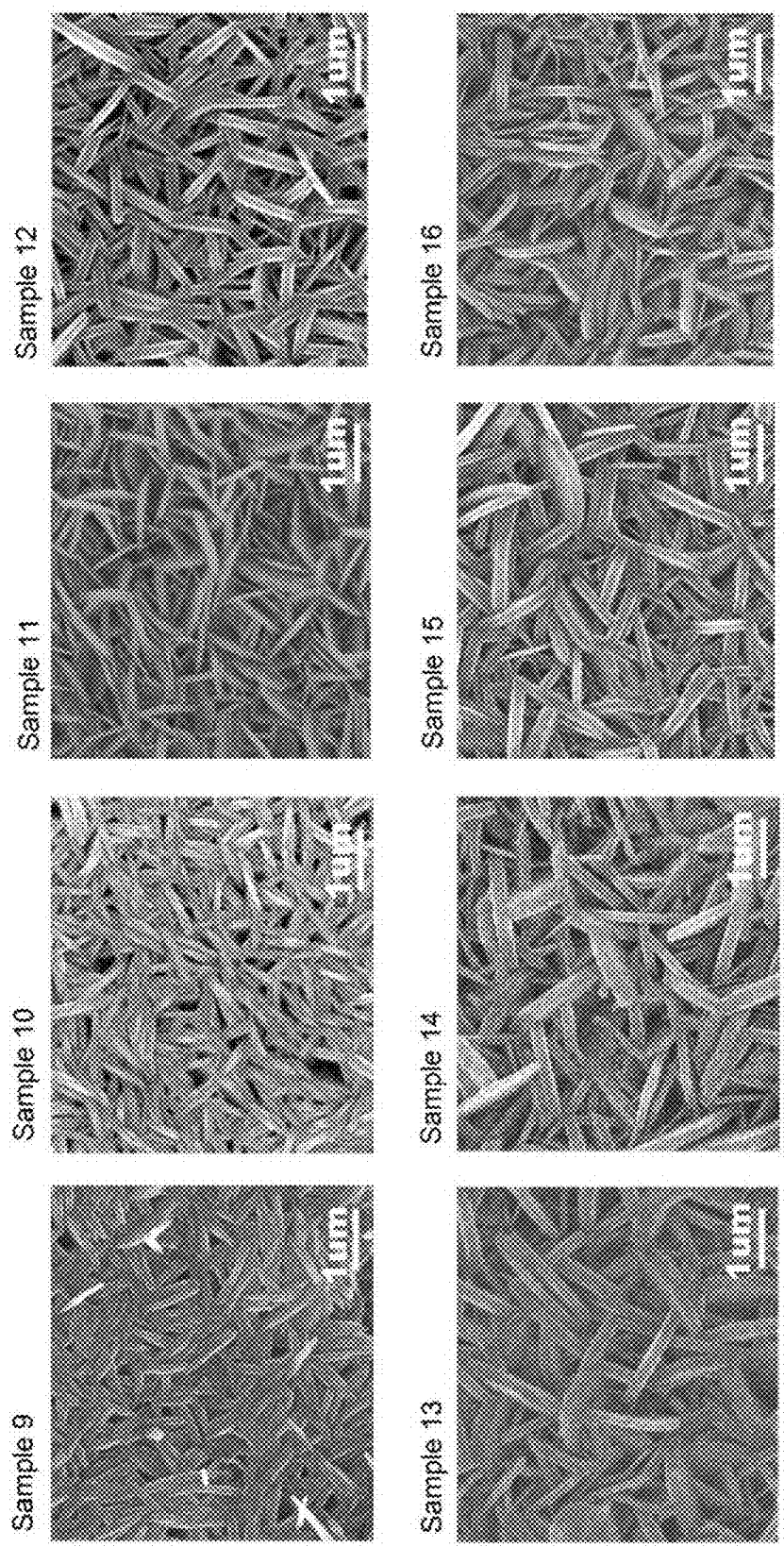
FIG. 12 shows SEM images of surface microstructures of samples 9 to 16 in Example B3.
Figure 13:
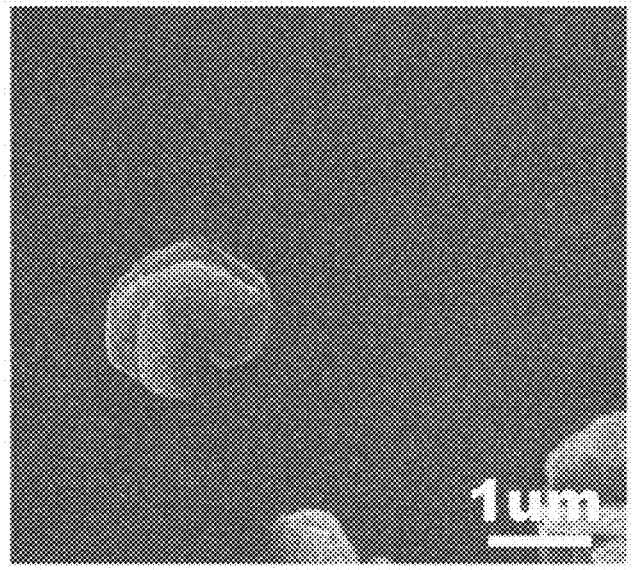
FIG. 13 shows a SEM image of a surface microstructure of comparative sample 18 in Example B3.

The surface microstructures of samples 1 to 6, 9 to 16 and 18 were observed with a scanning electron microscope (SEM; JSM-6610LV, JEOL Ltd.) at an acceleration voltage of to 20 kV. The resulting SEM images (i.e., secondary electron images) of the surface microstructures of samples 1 to 6, 9 to 16 and 18 are shown in FIGS. 11 to 13. These images demonstrates that sample 9 has the smallest voids (i.e., the highest density). In contrast, sample 18 did not have a shape of membrane.

Figure 14:
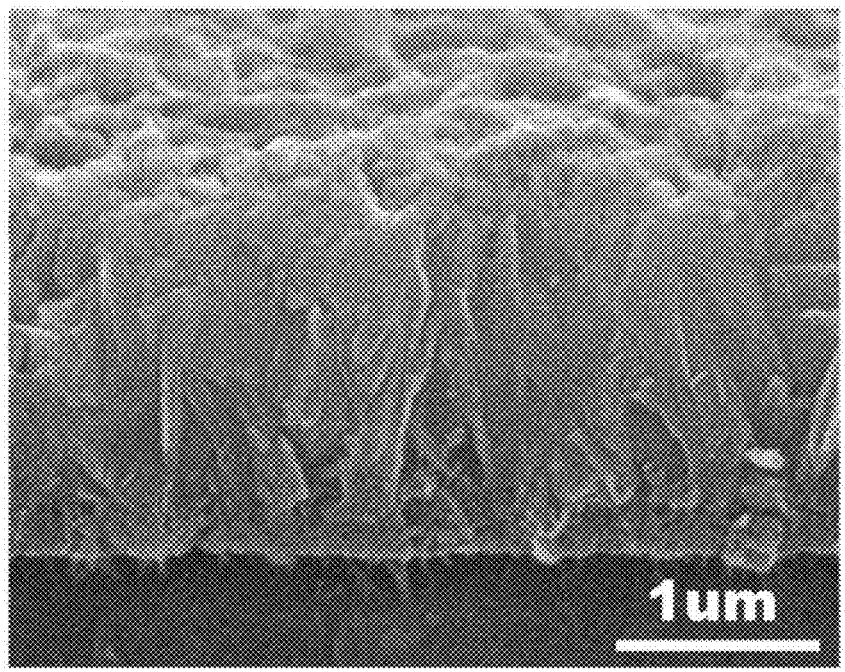
FIG. 14 shows a SEM image of a microstructure at a fracture surface of sample 9 in Example B3.

The microstructure of a cross-section of sample 9 was observed by the following procedures. The microstructure at a fractured cross-sectional surface of sample 9 (hereinafter referred to as a fracture surface) was observed with a scanning electron microscope (SEM; JSM-6610LV, JEOL Ltd.) at an acceleration voltage of 10 to 20 kV. The resulting SEM image of the microstructure at the fracture surface of sample 9 is shown in FIG. 14.

Figure 15:
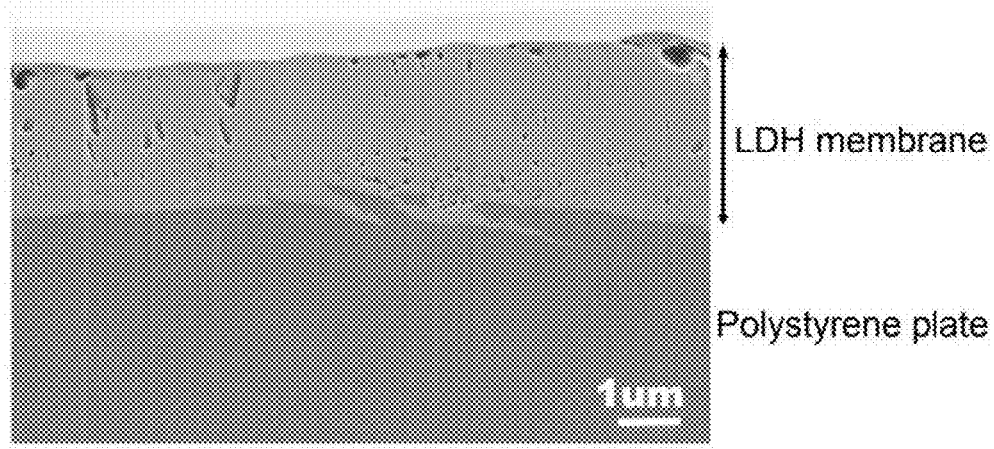
FIG. 15 shows a SEM image of a microstructure at a polished surface of sample 9 in Example B3.
Figure 16:
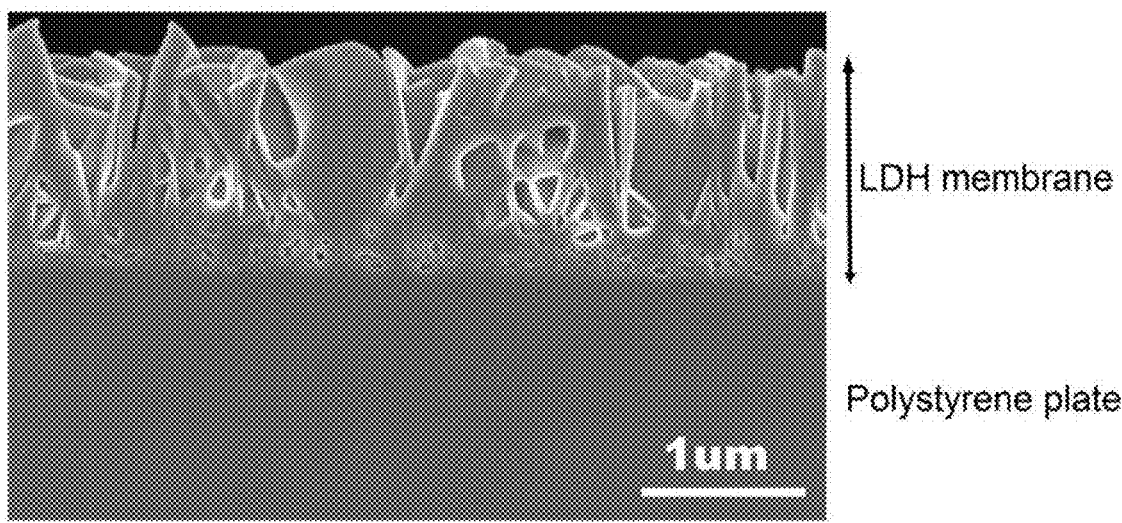
FIG. 16 shows a SEM image of a microstructure at a polished surface of sample 2 in Example B3.

Subsequently, the fracture surface of sample 9 was polished by FIB or cryomilling to form a polished cross-section. The microstructure of this polished cross-section was then observed with a field emission scanning electron microscope (FE-SEM) at an acceleration voltage of 1.5 to 3 kV. The resulting SEM image of the microstructure at the polished cross-section of sample 9 is shown in FIG. 15. The microstructure at a polished cross-section of sample 2 was observed as in sample 9, and the resulting SEM image is shown in FIG. 16.

Example B4 (Reference): Measurement of Porosity and Membrane Density

The porosity at the surfaces of samples 1 to 6, 9 to 16 and 18 was measured by a method involving image processing. The porosity was measured by the following procedures: 1) electron microscopic images of the surfaces of the membranes were taken at a magnification of not less than 10,000 as in Example B3; 2) the grayscale SEM images were read with an image analysis software, such as Photoshop (Adobe); 3) monochromatic binary images were generated with tools named [image], [color compensation] and [binarization] in this order; and 4) the porosity (%) was calculated by dividing the number of pixels of the black areas by the number of the pixels of the whole image. The porosity was measured over a 6 μm×6 μm area of the surfaces of the membranes.

The density D of the surface of the membrane (or a membrane surface density) was calculated by the equation D=100%−(the porosity at the surface of the membrane). Results of the calculation are shown in Table 3. The density of the membranes was rated on a scale of A to D based on the calculated density at the surfaces of the membranes.
<Evaluation Criteria of Density>
A: membrane surface density ≥90%;
B: 90%>membrane surface density ≥80%;
C: 80%>membrane surface density ≥50%;
D: 50%>membrane surface density.

The porosity at polished cross-sections of samples 2 and 9 was also measured. The porosity at the polished cross-sections was measured as in the above measurement of the porosity at the membrane surfaces except for taking electron microscopic images (i.e., SEM images) of the polished cross-sections at a magnification of not less than 10,000 as in Example B3. The porosity was measured over a 2 μm×4 μm area of the polished cross-sections of these oriented membrane. The porosity at the polished cross-section of sample 9 was 4.8% on average (i.e., the porosity at the two polished cross-sections was averaged). The result demonstrates formation of high density membranes. The porosity at the polished surface of sample 2 having a density lower than sample 9 was 22.9% on average (i.e., the porosity at the two polished cross-sections was averaged). Table 3 demonstrates that the porosity at the surface basically corresponds to the porosity at the cross-section. The results demonstrate that the density at the surfaces of the membranes calculated using the porosity of the surfaces and the evaluated density of the membranes based on the density of the surfaces of the membranes reflect not only the characteristics at the surfaces of the membranes but also across the thickness, i.e., the characteristics of the whole membranes.

TABLE 3

| | Sulfonation conditions | | Solution mixing conditions | | | Hydrothermal treatment conditions | | | Evaluation of membrane | | | | |
|---|---|---|---|---|---|---|---|---|---|---|---|---|---|
| | Soaking time in conc. sulfuric acid (day) | FTIR-ATR peak ratio $T_{1601}/T_{1127}$ | Cation ratio ($Mg^{2+}/Al^{3+}$) | Urea ratio (urea/$NO_3^-$) | Molar concentration of all metal ions ($Mg^{2+} + Al^{3+}$) (mol/L) | Temp. (° C.) | Time (day) | Heating rate (° C./h) | Porosity at cross-section (%) | Porosity at surface (%) | Membrane density at surface (%) | Density | Crystallographic orientation |
| Sample No. | | | | | | | | | | | | | |
| 1 | 3 | 0.894 | 2 | 4 | 0.200 | 70 | 7 | 150 | — | 18.8 | 81.2 | B | A |
| 2 | 3 | 0.894 | 2 | 4 | 0.253 | 70 | 7 | 150 | 22.9 | 19.7 | 80.3 | B | A |
| 3 | 3 | 0.894 | 2 | 4 | 0.267 | 70 | 7 | 150 | — | 11.5 | 88.5 | B | A |
| 4 | 3 | 0.894 | 2 | 4 | 0.280 | 70 | 7 | 150 | — | 26.1 | 73.9 | C | B |
| 5 | 6 | 0.921 | 2 | 4 | 0.280 | 70 | 7 | 150 | — | 13.5 | 86.5 | B | A |
| 6 | 12 | 0.941 | 2 | 4 | 0.240 | 70 | 7 | 150 | — | 14.3 | 85.7 | B | A |
| 7 | 12 | 0.941 | 2 | 4 | 0.253 | 70 | 7 | 150 | — | — | — | — | A |
| 8 | 12 | 0.941 | 2 | 4 | 0.267 | 70 | 7 | 150 | — | — | — | — | A |
| 9 | 12 | 0.941 | 2 | 4 | 0.280 | 70 | 7 | 150 | 4.8 | 6.5 | 93.5 | A | A |
| 10 | 12 | 0.941 | 2 | 4 | 0.320 | 70 | 7 | 150 | — | 11.6 | 88.4 | B | A |
| 11 | 3 | 0.894 | 3 | 4 | 0.200 | 70 | 7 | 150 | — | 45.8 | 54.2 | C | B |
| 12 | 3 | 0.894 | 2 | 5 | 0.200 | 70 | 7 | 150 | — | 18.8 | 81.2 | B | A |
| 13 | 3 | 0.894 | 2 | 4 | 0.200 | 90 | 7 | 150 | — | 31.3 | 68.7 | C | B |
| 14 | 3 | 0.894 | 2 | 5 | 0.200 | 90 | 7 | 150 | — | 22.0 | 78.0 | C | B |
| 15 | 3 | 0.894 | 2 | 4 | 0.200 | 70 | 14 | 150 | — | 23.4 | 76.6 | C | A |
| 16 | 3 | 0.894 | 2 | 4 | 0.200 | 70 | 7 | 10 | — | 23.6 | 76.4 | C | B |
| 17 | 12 | 0.941 | 2 | 4 | 0.400 | 70 | 7 | 150 | — | — | — | — | B |
| 18* | 0 | 0.861 | 2 | 4 | 0.200 | 70 | 7 | 150 | — | 100.0 | 0.0 | D | — |

*indicates this sample is comparative

Table 3 demonstrates that all samples 1 to 17 are generally dense membranes having a desired crystallographic orientation. In particular, samples 5 to 10 containing sulfonate groups in large amounts (i.e., high density) by long-time soaking for sulfonation are high density membranes having a high level of crystallographic orientation. In contrast, sample 18 using the non-sulfonated polystyrene substrate cannot cause nucleation of LDH and thus cannot have a shape of LDH membrane.

What is claimed is:

1. A battery including a separator comprising a layered-double-hydroxide-containing composite material comprising:
   a porous substrate; and
   a functional layer, exhibiting water impermeability, on and/or in the porous substrate, the functional layer containing a layered double hydroxide represented by general formula $M^{2+}_{1-x}M^{3+}_x(OH)_2A^{n-}_{x/n} \cdot mH_2O$, where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents a value not less than 0,
   wherein the layered double hydroxide is an agglomeration of platy particles, and the platy particles are oriented in such a manner that the tabular faces of the platy particles are substantially perpendicular to or oblique to the surface of the porous substrate,
   wherein the functional layer has a thickness of not more than 100 μm, and
   wherein the porous substrate exhibits water permeability.

2. The battery according to claim 1, wherein in the general formula, $M^{2+}$ comprises $Mg^{2+}$, $M^{3+}$ comprises $Al^{3+}$, and $A^{n-}$ comprises $OH^-$ and/or $CO_3^{2-}$.

3. The battery according to claim 1, wherein the surface of the functional layer has a porosity of not more than 20%.

4. The battery according to claim 1, wherein the functional layer is formed on the porous substrate.

5. The battery according to claim 1, wherein the functional layer has a thickness of not more than 50 μm.

6. The battery according to claim 1, wherein the functional layer has a thickness of not more than 5 μm.

7. The battery according to claim 1, wherein the porous substrate is composed of at least one selected from the group consisting of ceramics, metals and polymers.

8. The battery according to claim 7, wherein the porous substrate is composed of a ceramic, and the ceramic is at least one selected from the group consisting of alumina, zirconia, titania, magnesia, spinel, calcia, cordierite, zeolite, mullite, ferrite, zinc oxide, silicon carbide, aluminum nitride, and silicon nitride.

9. The battery according to claim 7, wherein the porous substrate is composed of a polymer, and the polymer is at least one selected from the group consisting of polystyrene, polyether sulfone, polypropylene, epoxy resin, and polyphenylene sulfide.

10. The battery according to claim 1, wherein the porous substrate has an average pore diameter of 0.001 to 1.5 μm.

11. The battery according to claim 1, wherein the surface of the porous substrate has a porosity of 10 to 60%.

12. A method for producing a separator for a battery comprising a layered-double-hydroxide-containing composite material, the method comprising:
   providing a porous substrate;
   soaking the porous substrate in an aqueous stock solution that contains magnesium ions ($Mg^{2+}$) and aluminum ions ($Al^{3+}$) in a total concentration of 0.20 to 0.40 mol/L and urea; and
   performing hydrothermal treatment of the porous substrate in the aqueous stock solution to form a functional layer, exhibiting water impermeability, on and/or in the porous substrate, the functional layer containing a layered double hydroxide represented by general formula $M^{2+}_{1-x}M^{3+}_x(OH)_2A^{n-}_{x/n} \cdot mH_2O$, where $M^{2+}$ represents a divalent cation, $M^{3+}$ represents a trivalent cation, $A^{n-}$ represents an n-valent anion, n represents an integer not less than 1, x represents a value of 0.1 to 0.4, and m represents a value not less than 0, wherein the layered double hydroxide is an agglomeration of platy particles, and the platy particles are oriented in such a manner that the tabular faces of the platy particles are substantially perpendicular to or oblique to the surface of the porous substrate, wherein the functional layer has a thickness of not more than 100 μm, and wherein the porous substrate exhibits water permeability.

13. The method according to claim 12, wherein the total concentration of the magnesium ions and the aluminum ions ranges from 0.24 to 0.36 mol/L.

14. The method according to claim 12, wherein the hydrothermal treatment is performed in a sealed container at a temperature of 60 to 150° C.

15. The method according to claim 12, wherein the aqueous stock solution contains dissolved magnesium nitrate and aluminum nitrate, and the aqueous stock solution thereby contains nitrate ions in addition to the magnesium ions and the aluminum ions.

16. The method according to claim 15, wherein a molar ratio of the urea to the nitrate ions ($NO_3^-$) in the aqueous stock solution ranges from 4 to 5.

17. The method according to claim 12, wherein the porous substrate is composed of at least one selected from the group consisting of ceramics, metals and polymers.

18. The method according to claim 17, wherein the porous substrate is composed of a ceramic, and the ceramic is at least one selected from the group consisting of alumina, zirconia, titania, magnesia, spinel, calcia, cordierite, zeolite, mullite, ferrite, zinc oxide, silicon carbide, aluminum nitride, and silicon nitride.

19. The method according to claim 17, wherein the porous substrate is composed of a polymer, and the polymer is at least one selected from the group consisting of polystyrene, polyether sulfone, polypropylene, epoxy resin, and polyphenylene sulfide.

20. The method according to claim 12, wherein the porous substrate has an average pore diameter of 0.0001 to 1.5 μm.

21. The method according to claim 12, wherein the surface of the porous substrate has a porosity of 10 to 60%.

* * * * *